US011651551B2

(12) United States Patent
Ray et al.

(10) Patent No.: US 11,651,551 B2
(45) Date of Patent: *May 16, 2023

(54) CODING OF COMPONENT OF COLOR ATTRIBUTES IN GEOMETRY-BASED POINT CLOUD COMPRESSION (G-PCC)

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Geert Van der Auwera, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,792

(22) Filed: Sep. 24, 2021

(65) Prior Publication Data

US 2022/0108479 A1 Apr. 7, 2022

Related U.S. Application Data

(60) Provisional application No. 63/088,306, filed on Oct. 6, 2020.

(51) Int. Cl.
*G06T 17/00* (2006.01)
*G06T 9/00* (2006.01)
*G06T 19/20* (2011.01)

(52) U.S. Cl.
CPC .............. *G06T 17/00* (2013.01); *G06T 9/00* (2013.01); *G06T 19/20* (2013.01); *G06T 2210/36* (2013.01); *G06T 2219/2016* (2013.01)

(58) Field of Classification Search
None
See application file for complete search history.

(56) References Cited

U.S. PATENT DOCUMENTS

| 2011/0102460 A1* | 5/2011 | Parker | A63F 13/79 |
| | | | 707/E17.044 |
| 2015/0016512 A1* | 1/2015 | Pu | H04N 19/61 |
| | | | 375/240.03 |

(Continued)

FOREIGN PATENT DOCUMENTS

| WO | 2019195921 A1 | 10/2019 |
| WO | 2020189982 A1 | 9/2020 |

OTHER PUBLICATIONS

Ali Khairat, Tung Nguyen, Mischa Siekmann, Detlev Marpe, Thomas Wiegand, "Adaptive Cross-Component Prediction for 4:4:4 High Efficiency Video Coding", Oct. 30, 2014, IEEE, 2014 IEEE International Conference on Image Processing (ICIP), pp. 3734-3738.*

(Continued)

*Primary Examiner* — Robert Bader
(74) *Attorney, Agent, or Firm* — Shumaker & Sieffert, P.A.

(57) ABSTRACT

A device for decoding encoded point cloud data can be configured to: for a point of a point cloud, determine a first attribute value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second attribute (Continued)

value for a second color component based on a second predicted value and the final second residual value.

52 Claims, 9 Drawing Sheets

(56) References Cited

U.S. PATENT DOCUMENTS

| | | | |
|---|---|---|---|
| 2015/0373349 A1 | 12/2015 | Zhang et al. | |
| 2016/0080751 A1* | 3/2016 | Xiu | H04N 19/157 |
| | | | 375/240.02 |
| 2017/0318301 A1* | 11/2017 | Li | H04N 19/70 |
| 2018/0306588 A1* | 10/2018 | Bjorke | G01C 21/206 |
| 2019/0156518 A1 | 5/2019 | Mammou et al. | |
| 2019/0226853 A1* | 7/2019 | Kubiak | G01S 17/06 |
| 2020/0219290 A1 | 7/2020 | Tourapis et al. | |
| 2020/0279404 A1 | 9/2020 | Vosoughi et al. | |
| 2021/0104072 A1* | 4/2021 | Yea | G06T 3/40 |
| 2022/0109816 A1 | 4/2022 | Ray et al. | |

OTHER PUBLICATIONS

International Search Report and Written Opinion—PCT/US2021/052246—ISA/EPO—dated Jan. 4, 2022 15 pp.

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

Pu (QUALCOMM) W., et al., "RCE1: Descriptions and Results for Experiments 1, 2, 3, and 4", 15 JCT-VC Meeting; JCTVC-O0202_v3, Oct. 25, 2013-Nov. 1, 2013; Geneva; (Joint Collaborative Team on Video Coding of ISO/IEC JTC1/SC29/WG11 and ITU-TSG.16), No. JCTVC-O0202 Nov. 11, 2013 (Nov. 11, 2013), XP030238913, 10 pages, Retrieved from the Internet: URL: http://phenix.int-evry.fr/jct/doc_end_user/documents/15_Geneva/wg11/JCTVC-O0202-v5.zip JCTVC-O0202_r4.doc [retrieved on Nov. 11, 2013].

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

Khairat A., et al., "Adaptive Cross-Component Prediction for 4:4:4 High Efficiency Video Coding", Oct. 30, 2014, 5 Pages, IEEE, 2014 IEEE International Conference on Image Processing (ICIP), pp. 3734-3738.

Ray B (QUALCOMM)., et al., "[G-PCC][New] On Inter-Component Residual Prediction", 132, MPEG Meeting, Oct. 12, 2020-Oct. 16, 2020, Online, (Motion Picture Expert Group or ISO/IEC JTC1/SC29/WG11), No. M55373, Oct. 7, 2020, XP030292897, 2 Pages.

"Text of ISO/IEC 23090-9 DIS Geometry-Based Point Cloud Compression", 129. MPEG Meeting, Jan. 13, 2020-Jan. 17, 2020, Brussels, (Motion Picture Expert Group or ISO/IEC JTC1/SC29/WG11), No. n19088, Apr. 20, 2020 (Apr. 20, 2020), XP030287970, 126 Pages, Retrieved from the Internet: URL:http://phenix.int-evry.fr/mpeg/doc_end_user/documents/129 Brussels/wg11/w19088.zip w19088_d10_clean.pdf [retrieved on-Apr. 20, 2020] Sections 8.2.4. 8.2.5.

Yea S., et al., "[G-PCC] EE13. 7 Report on Inter-Channel Prediction for Attribute Coding", 128. MPEG Meeting, Oct. 7, 2019-Oct. 11, 2019, Geneva, (Motion Picture Expert Group or ISO/IEC JTC1/SC29/WG11), No. M51160, Oct. 10, 2019, XP030221619, 9 Pages.

* cited by examiner

CODING OF COMPONENT OF COLOR ATTRIBUTES IN GEOMETRY-BASED POINT CLOUD COMPRESSION (G-PCC)

This application claims the benefit of U.S. Provisional Patent Application 63/088,306, filed 6 Oct. 2020, the entire content of which is incorporated herein by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

According to some techniques, to improve coding-efficiency, G-PCC encoders and decoders may be configured to predict attribute values (e.g., YCbCr) for points from the attribute values of already-coded neighboring points and signal, from encoder to decoder, difference values between the predicted attribute values and the actual attribute values. For some color components (e.g., Cr), the encoder and decoder may be configured to determine an initial prediction value based on an already-coded neighboring point and additionally predict the residual value based on the already-coded residual value of another component (e.g., Cb). Thus, instead of signaling the full difference between the initial prediction of the attribute value and the actual attribute value, the G-PCC encoder only needs to signal to the G-PCC decoder the remaining difference between the actual attribute value and the initial prediction value plus the predicted residual value. As this remaining residual value may typically be a smaller number than the full residual value, the remaining residual value may be signaled with fewer bits than the full residual value. This use of prediction and residual values may reduce the bits needed to signal attribute values when compared to signaling attribute values directly.

This disclosure describes techniques for determining the predicted residual value. G-PCC encoders and G-PCC decoders implementing the techniques of this disclosure may be able to generate more accurate predicted residual values, making the remaining residual values smaller when compared to the remaining residual values determined by existing residual prediction techniques. As smaller values can typically be coded using fewer bits, by making remaining residual values smaller, the techniques of this disclosure may reduce the overall number of bits needed to signal attribute values.

According to one example, a device for decoding encoded point cloud data includes a memory configured to store the encoded point cloud data and one or more processors implemented in circuitry, and configured to: for a point of a point cloud, determine a first attribute value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second attribute value for a second color component based on a second predicted value and the final second residual value.

According to another example, a method of decoding encoded point cloud data includes, for a point of a point cloud, determining a first attribute value for a first color component based on a first predicted value and a first residual value; applying a scaling factor to the first residual value to determine a predicted second residual value, wherein the scaling factor has one or both of a non-integer value or an absolute value greater than one; for the point of the point cloud, receiving a second residual value in the encoded point cloud data; determining a final second residual value based on the predicted second residual value and the received second residual value; and for the point of the point cloud, determining a second attribute value for a second color component based on a second predicted value and the final second residual value.

According to another example, a device for encoding point cloud data includes a memory configured to store the encoded point cloud data and one or more processors, implemented in circuitry, and configured to: for a point of a point cloud, determine a first attribute value for a first color component; encode the first attribute value for the first color component as a first predicted value and a first residual value; for the point of the point cloud, determine a second attribute value for a second color component; determine a second predicted value for the second attribute value for the second color component; determine a second residual value for the second attribute value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

According to another example, a method of encoding point cloud data includes, for a point of a point cloud, determining a first attribute value for a first color component; encoding the first attribute value for the first color component as a first predicted value and a first residual value; for the point of the point cloud, determining a second attribute value for a second color component; determining a second predicted value for the second attribute value for the second color component; determining a second residual value for the second attribute value for the second color component; applying a scaling factor to the first residual value to determine a predicted second residual value, wherein the scaling factor has one or both of a non-integer value or an absolute value greater than one; and generating, for inclusion in the point cloud data, a syntax element representing a difference between the second residual value and the predicted second residual value.

According to another example, a computer-readable storage medium stores instructions that when executed by one or more processors cause the one or more processors to: for a point of a point cloud, determine a first attribute value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second attribute value for a second color component based on a second predicted value and the final second residual value.

According to another example, a computer-readable storage medium stores instructions that when executed by one or more processors cause the one or more processors to: for a point of a point cloud, determine a first attribute value for a first color component; encode the first attribute value for the first color component as a first predicted value and a first residual value; for the point of the point cloud, determine a second attribute value for a second color component; determine a second predicted value for the second attribute value for the second color component; determine a second residual value for the second attribute value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

According to another example, an apparatus for decoding encoded point cloud data includes means for determining, for a point of a point cloud, a first attribute value for a first color component based on a first predicted value and a first residual value; means for applying a scaling factor to the first residual value to determine a predicted second residual value, wherein the scaling factor has one or both of a non-integer value or an absolute value greater than one; means for receiving, for the point of the point cloud, a second residual value in the encoded point cloud data; means for determining a final second residual value based on the predicted second residual value and the received second residual value; and means for determining, for the point of the point cloud, a second attribute value for a second color component based on a second predicted value and the final second residual value.

According to another example, an apparatus for encoding point cloud data includes means for determining, for a point of a point cloud, a first attribute value for a first color component; means for encoding the first attribute value for the first color component as a first predicted value and a first residual value; means for determining, for the point of the point cloud, a second attribute value for a second color component; means for determining a second predicted value for the second attribute value for the second color component; means for determining a second residual value for the second attribute value for the second color component; means for applying a scaling factor to the first residual value to determine a predicted second residual value, wherein the scaling factor has one or both of a non-integer value or an absolute value greater than one; and means for generating, for inclusion in the point cloud data, a syntax element representing a difference between the second residual value and the predicted second residual value.

According to another example, a computer program product comprises program instructions that when executed by one or more processors cause the one or more processors to: for a point of a point cloud, determine a first attribute value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second attribute value for a second color component based on a second predicted value and the final second residual value.

According to another example, a computer program product comprises program instructions that when executed by one or more processors cause the one or more processors to: for a point of a point cloud, determine a first attribute value for a first color component; encode the first attribute value for the first color component as a first predicted value and a first residual value; for the point of the point cloud, determine a second attribute value for a second color component; determine a second predicted value for the second attribute value for the second color component; determine a second residual value for the second attribute value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

According to another example, a device for decoding encoded point cloud data, the device comprising means for determining a first attribute value for a first color component based on a first predicted value and a first residual value for a point of a point cloud; means for applying a scaling factor to the first residual value to determine a predicted second residual value, wherein the scaling factor has one or both of a non-integer value or an absolute value greater than one; means for receiving a second residual value in the encoded point cloud data for the point of the point cloud; means for determining a final second residual value based on the predicted second residual value and the received second residual value; and means for determining a second attribute value for a second color component of the point of the point cloud based on a second predicted value and the final second residual value.

According to another example, a device for encoding point cloud data, the device comprising means for determining a first attribute value for a first color component of a point of a point cloud; means for encoding the first attribute value for the first color component as a first predicted value and a first residual value; means for determining a second attribute value for a second color component of the point of the point cloud; means for determining a second predicted value for the second attribute value for the second color component; means for determining a second residual value for the second attribute value for the second color component; means for applying a scaling factor to the first residual value to determine a predicted second residual value, wherein the scaling factor has one or both of a non-integer value or an absolute value greater than one; and means for generating, for inclusion in the encoded point cloud data, a syntax element representing a difference between the second residual value and the predicted second residual value.

The details of one or more examples are set forth in the accompanying drawings and the description below. Other features, objects, and advantages will be apparent from the description, drawings, and claims.

DETAILED DESCRIPTION

Figure 1:
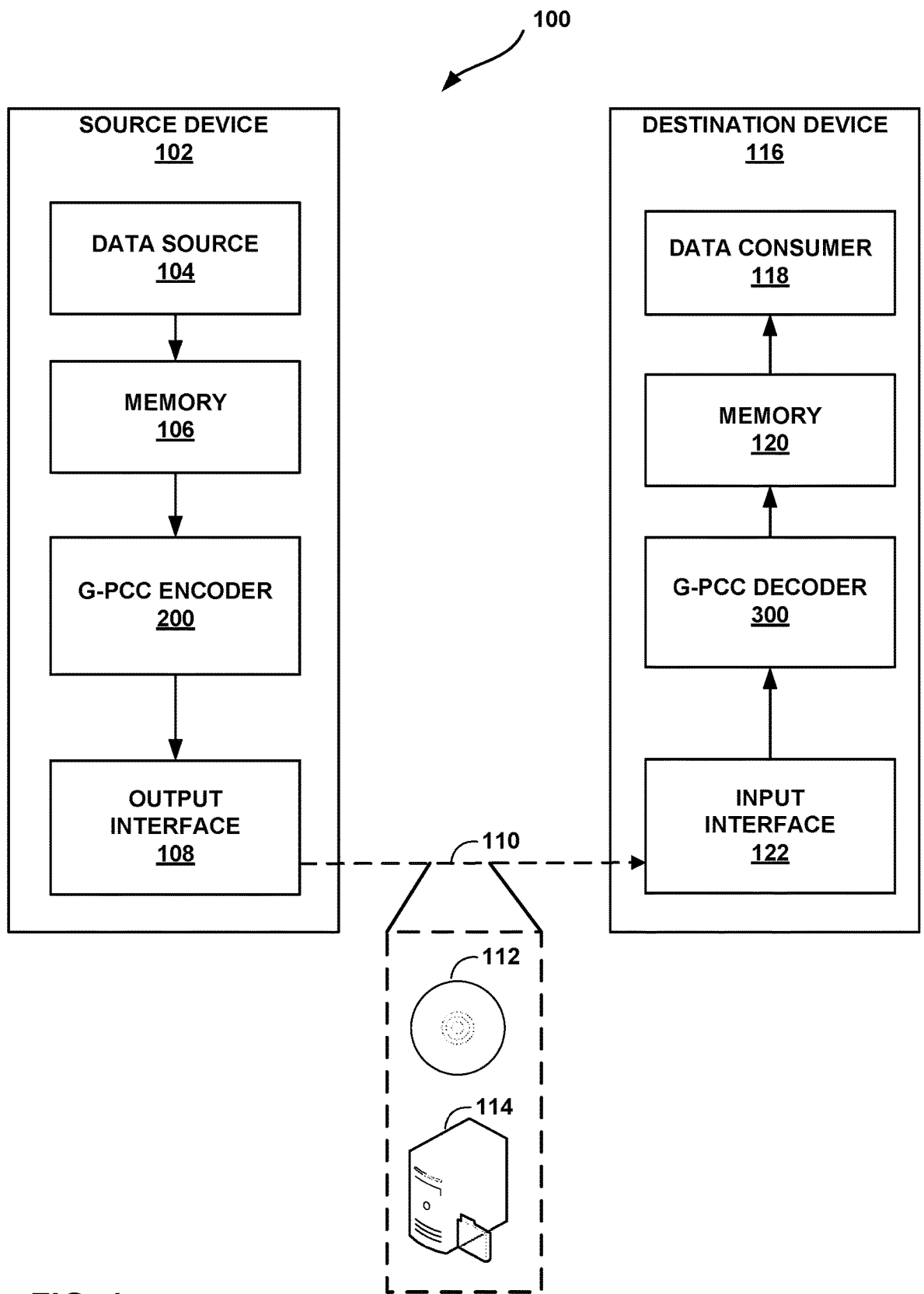
FIG. 1 is a block diagram illustrating an example encoding and decoding system that may perform the techniques of this disclosure.

"Geometry-based point cloud compression" (G-PCC) directly compresses 3D geometry i.e., the positions of a set of points in a 3D space. G-PCC also compresses associated attribute values, such as color values or luminance/chrominance values, for each point associated with the 3D geometry.

A point cloud contains a set of points in a 3D space and may have attributes associated with the points. The attributes may, for example, be color information such as R/G/B, Y/Cb/Cr, reflectance information, or other attributes such as temperature values, humidity values, latitude coordinates, longitude coordinates, and the like. Point clouds may be captured by a variety of cameras or sensors such as light detection and ranging (LIDAR) scanners or 3D scanners and may also be computer-generated. Point cloud data can be used in a variety of applications including, but not limited to, construction (e.g., modeling), graphics (e.g., 3D models for visualizing and animation), and the automotive industry (e.g., LIDAR sensors used to help in navigation).

The 3D space occupied by point cloud data may be enclosed by a virtual bounding box. The positions of the points in the bounding box may be represented by a certain precision. Thus, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles, and each tile may be coded into one or more slices. The partitioning of the bounding box into slices and tiles may be based on a number of points in each partition, or based on other considerations (e.g., a particular region may be coded as tiles). The slice regions may be further partitioned using splitting decisions similar to those in video codecs.

To improve the coding efficiency for the compression of color attribute information, G-PCC encoders and decoders may be configured to perform a color space conversion as a pre- or post-processing step, by for instance converting RGB values to YCbCr values. Even after such conversion, there still is often significant correlation among channels in the converted color-space. This correlation among color channels can be exploited to improve attribute coding efficiency.

According to some techniques, to improve coding-efficiency, G-PCC encoders and decoders may be configured to predict attribute values (e.g., YCbCr) for points from the attribute values of already-coded neighboring points and signal, from encoder to decoder, difference values between the predicted attribute values and the actual attribute values. For some color components (e.g., Cr), the encoder and decoder may be configured to determine an initial prediction value based on an already-coded neighboring point and additionally predict the residual value based on the already-coded residual value of another component (e.g., Cb). Thus, instead of signaling the full difference between the initial prediction of the attribute value and the actual attribute value, the G-PCC encoder only needs to signal to the G-PCC decoder the remaining difference between the actual attribute value and the initial prediction value plus the predicted residual value. As this remaining residual value may typically be a smaller number than the full residual value, the remaining residual value may be signaled with fewer bits than the full residual value. This use of prediction and residual values may reduce the bits needed to signal attribute values when compared to signaling attribute values directly.

An example technique for signaling residual values will now be described. In this example, res_Cb and res_Cr represent the residual values of the Cb and Cr color components, respectively. It can be observed that the Cb and Cr residual values may be approximated by the following relationship:

$$\text{res\_Cr} \approx s \cdot \text{res\_Cb}$$

where s is a scalar value, which can have one of three values: +1, −1 or 0, indicating positive correlation, negative correlation, and no correlation, respectively. To signal s, for example, the encoder may include in the point cloud data, and the decoder may parse from the point cloud data, a flag indicating whether or not s is nonzero. If s is nonzero, then the encoder may include in the point cloud data, and the decoder may parse from the point cloud data, a second flag to indicate the sign. For the coding of Res_Cr, the encoder and decoder may perform a further prediction from Res_Cb with the scaling factor of s, and thus only the remaining residual value needs to be included in the point cloud data. From the decoder perspective, if ResCr and ResCb are the residual samples reconstructed from the bitstream for Cb and Cr, respectively, then the final Cr residual can be determined as Res'Cr=ResCr+s*ResCb.

Although the above-described technique exploits the correlation (positive or negative) between two color components, i.e., two channels, this technique does not exploit the fact that the residual energy of the two color components may be different in addition to having positive or negative correlation. Thus, s may not always be well represented by only +1, 0, or −1.

This disclosure describes techniques for utilizing more diversified values of s, where s may be any value with a fractional accuracy of p. This disclosure also describes techniques for signaling these values of s. For example, for p=¼, the possible values of s are k*p=k/4, where k is an integer. The value of p may be fixed, predetermined, or signaled. In some examples, s values may have a range of [−a, +a] with an accuracy of p. For example, for a=2, and p=¼, the scaling factor values are s: {−2, −7/4, −6/4, −5/4, −1, −¾, −2/4, −¼, 0, ¼, 2/4, ¾, 1, 5/4, 6/4, 7/4, 2}. In other examples, a and p may have different values, such as 1 and ⅛, respectively, or some other combination of values. The values of a and p may be fixed, predetermined, signaled, or any combination thereof. As will be explained in more detail below, the scaling factor values of s can also be implemented as a combination of a multiplication operation and a bit shift operation to potentially avoid floating point operations, and thus reduce computational complexity.

As one example, assume that a point of a point cloud has attribute values of (Y, Cb, Cr)=(100, 80, 82). A G-PCC decoder may predict, from previously coded points predicted attribute values of (predY, predCb, predCr)=(90, 76, 75). Thus, the residual values, meaning the differences between the actual attribute values for the point and the predicted attribute values for the point, are (resY, resCb, resCr)=(10, 4, 7). Thus, a G-PCC encoder may include in the point cloud values of 10 and 4 for resY and resCb. For resCr, however, the G-PCC encoder may include in the point cloud a value equal to 7−s*resCb. If s can only equal −1, 0, or 1, then the G-PCC encoder includes in the point cloud data a value of 3 (3=7−s*4, with s equal to 1). Utilizing the techniques of this disclosure, however, a G-PCC encoder may, for example, be able to include in the point cloud data a value of 0 instead of 3 (0=7−s*4, with s equal to 7/4). As 0 is less than 3, the G-PCC encoder may be able to code a value of 0 using fewer bits than a value of 3.

Thus, by determining a scaling factor that has one or both of a non-integer value or an absolute value greater than one, G-PCC encoders and G-PCC decoders may be able to generate more accurate predicted residual values, making the remaining residual values smaller when compared to the remaining residual values determined using scaling factors of only −1, 0, and 1. As smaller values can typically be coded using fewer bits, by making remaining residual values smaller, the techniques of this disclosure may reduce the overall number of bits needed to signal attribute values.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to coding of components of color attributes in G-PCC. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to coding of a last component of color attributes in G-PCC. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a LIDAR device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of point clouds to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the points. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
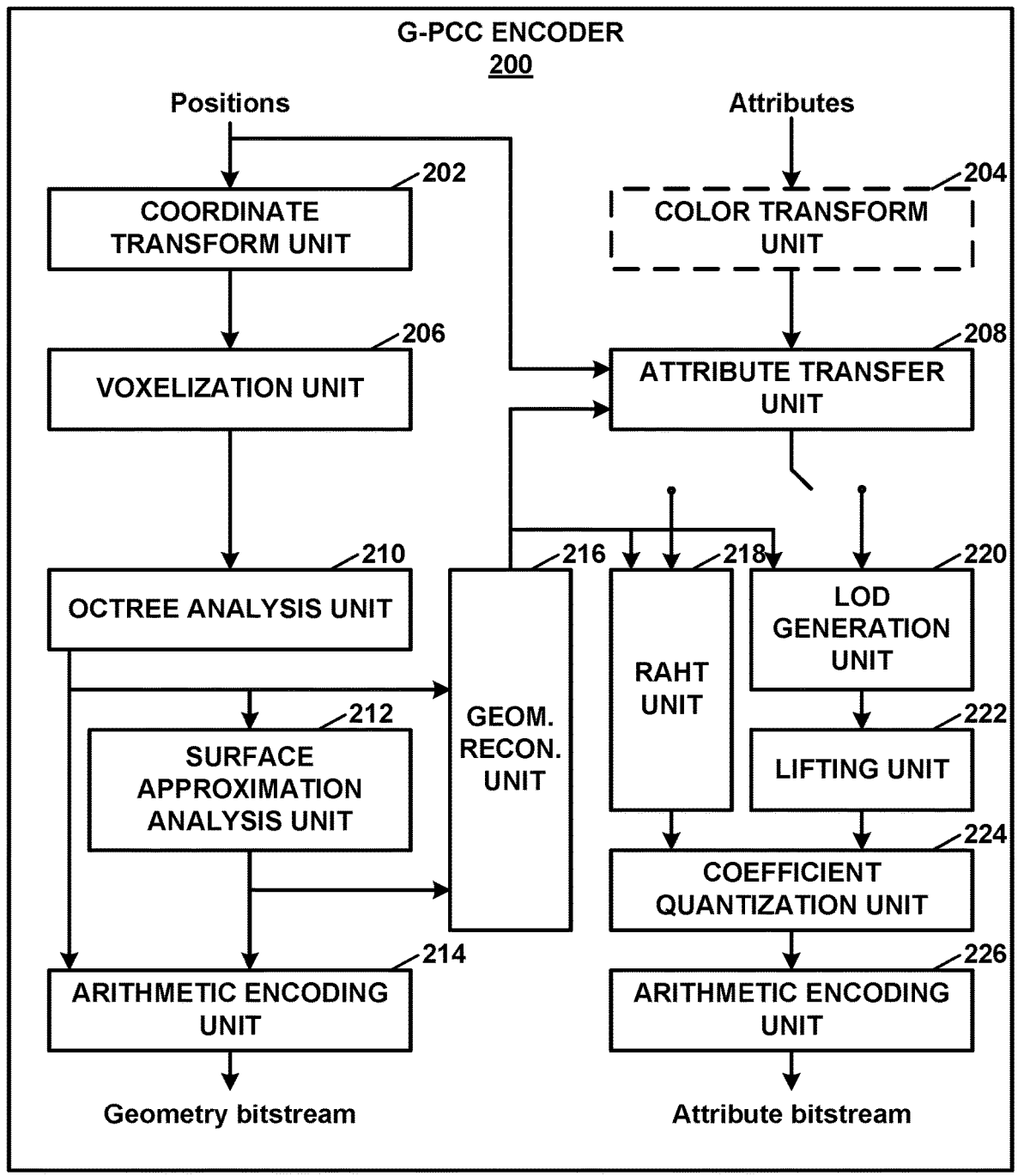
FIG. 2 is a block diagram illustrating an example Geometry Point Cloud Compression (G-PCC) encoder.
Figure 3:
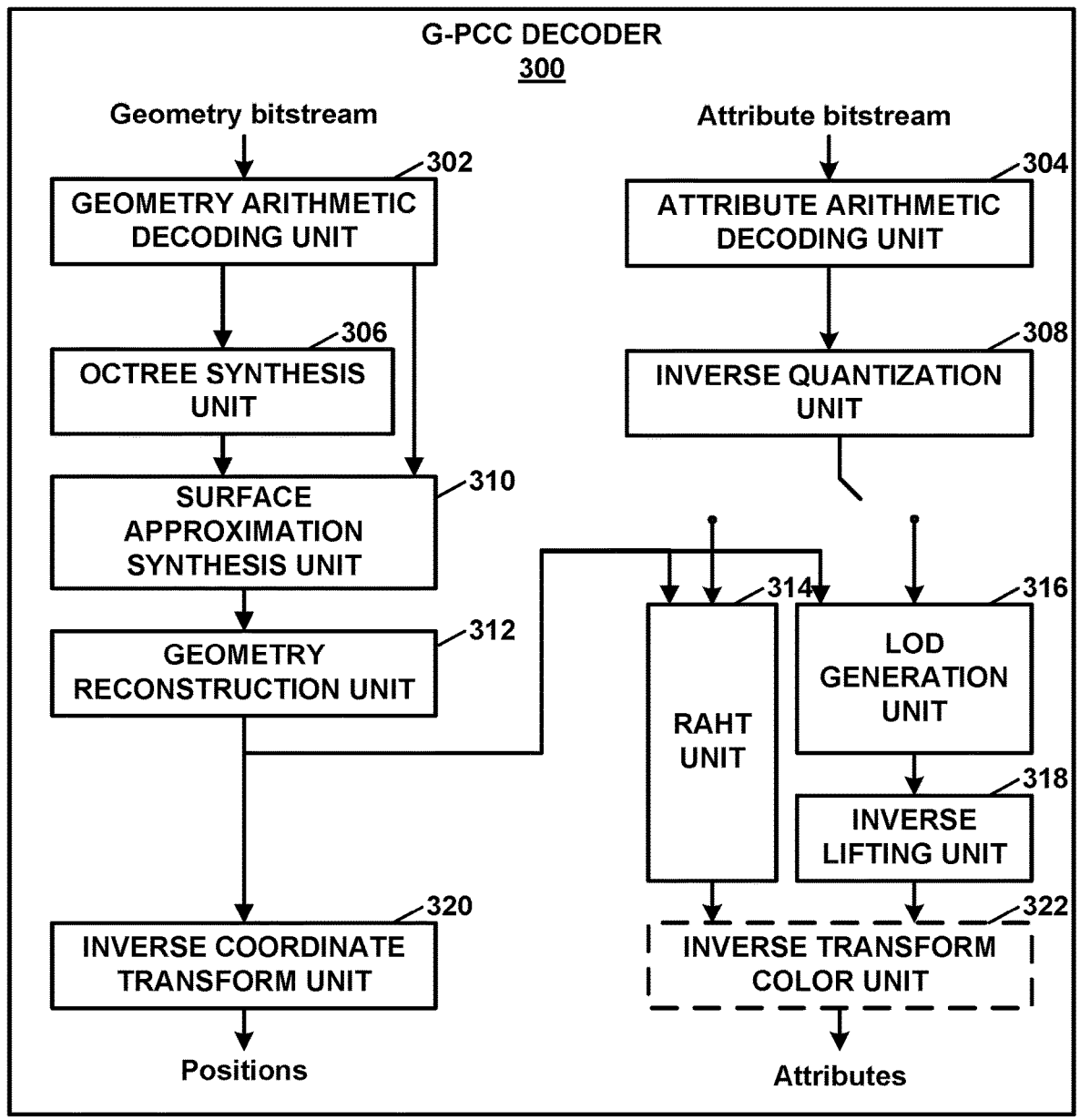
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, surface approximation analysis units 212 and 310 and RAHT units 218 and 314 represent options typically used for Category 1 data, while LOD generation units 220 and 316, lifting unit 222, and inverse lifting unit 318 represent options typically used for Category 3 data. All the other units may be common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model (known as Trisoup coding). The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding processes in G-PCC: Region Adaptive Hierarchical Transform (RAHT) coding, interpolation-based hierarchical nearest-neighbor prediction (Predicting Transform), and interpolation-based hierarchical nearest-neighbor prediction with an update/lifting step (Lifting Transform). RAHT and Lifting are typically used for Category 1 data, while predicting is typically used for Category 3 data. However, either process may be used for any data, and as with the geometry codecs in G-PCC, the attribute coding process used to code the point cloud may be specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance. Level of detail generation partitions a set of input points into a series of detail levels and associated refinement layers. A level of detail is a set of points that represents a subsampled version of the slice geometry. The zero-th level of detail is the full resolution slice geometry.

At G-PCC encoder 200, the residuals obtained as the output of the coding process for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. In some examples, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

In one or more examples, for the compression of color attributes, to improve coding efficiency, G-PCC encoder 200 and G-PCC decoder 300 may be configured to perform a color space conversion as a pre-/post-processing step. The color space conversion may, for example, convert the color data from RGB to YCbCr or from YCbCr to RGB, as described above. Even after such conversion, there still is significant correlation among color components, also referred to as channels, in the converted color-space. The correlation among color channels can be exploited to improve attribute coding efficiency.

The following provides details for exploiting the inter-channel correlation only between the chroma signals for a lifting transform. For purposes of example, let $res_{Cb}$ and $res_{Cr}$ denote the lifting coefficients of Cb and Cr channels, respectively. In many coding scenarios, the Cb and Cr chroma coefficients from lifting may be well-approximated by the following relationship:

$$res_{Cr} \approx s \cdot res_{Cb}$$

where s is a scalar value, which can have three values: +1, −1 and 0 respectively indicating positive, negative and no correlation. In some examples, G-PCC encoder 200 signals an s value for each LOD. For "s" signaling, G-PCC encoder 200 may first encode a flag indicating whether "s" is nonzero or not, and if "s" is nonzero, then G-PCC encoder 200 may encode a second flag indicating the sign of "s". This signaling may be part of the attribute data payload and CABAC coded.

For the coding of $Res_{Cr}$, G-PCC encoder 200 may perform a further prediction from $Res_{Cb}$ with the scaling factor of s, and then signal the remaining residual value. From the decoder perspective (e.g., perspective of G-PCC decoder 300), if ResCr and ResCb are the residual samples reconstructed from the bitstream for Cb and Cr, respectively, then the final Cr residual is: Res'Cr=ResCr+s*ResCb. An additional flag in APS, aps.inter_chroma_prediction_enabled_flag, may enable and disable this feature at high level.

There may be potential problems if the scaling factor s is limited to −1, 0, or +1. Although the correlation (positive or negative) between two channels (e.g., two color components like Cb and Cr) may be exploited by using the scaling factor s limited to −1, 0, or +1, the fact that the residual energy of two components may be different in addition to having positive or negative correlation, which may not be well represented by only +1, 0, or −1.

The disclosure describes some example techniques that may be utilized together or separately. The example techniques may address the above described issues. However, the techniques described in this disclosure should not be considered as requiring that the above issues be addressed with the examples described in this disclosure. The example techniques may address different or additional issues than those described above.

According to the techniques of this disclosure, G-PCC encoder 200 and G-PCC decoder 300 may be configured to utilize more diversified values of s. These values of s may be signaled per LOD, where s could be any value with an (fractional) accuracy of p. For example, for p=¼, the possible values of s are k*p=k/4, where k is an integer. A value for p value may be fixed, predetermined (e.g., inferred), or signaled.

In some examples, s values may have a range of [−a, +a] with an accuracy of p. For example, for a=2, and p=¼, the scaling factor values are s: {−2, −7/4, −6/4, −5/4, −1, −¾, −2/4, −¼, 0, ¼, 2/4, ¾, 1, 5/4, 6/4, 7/4, 2}. The a and p values may be fixed, predetermined, or signaled.

In some examples, the accuracy p may be represented as a power of 2, i.e., $p=½^b$. The division associated with s may be represented by a right shift:

Res'Cr=ResCr+(k*ResCb>>b).

where k is scaled version of s, i.e., k=s<<b (equivalent of s'=s*p).

In some examples, a rounding term may be incorporated for the prediction. Accordingly, G-PCC decoder 300 may determine the final residual as: Res'Cr=ResCr+((k*ResCb+1<<(b−1))>>b).

G-PCC encoder 200 may be configured to signal k per LOD level (k[lod]) by direct coding, for example, by signaling the absolute value of k[lod] followed by the sign if applicable (if k[lod] is not equal to zero). For the magnitude coding, G-PCC encoder 200 may be configured to use either fixed length coding, where the length may be predetermined, fixed or signaled, or variable length coding. The resulting signs are often correlated in the neighboring LODs. Accordingly, signs may also be coded with a dedicated context.

In some examples, k values for different LODs may be highly correlated to each other. Accordingly, k[lod] may be predicted from k[lod−1], if applicable, and G-PCC encoder 200 may signal the difference (k[lod]−k[lod−1]). The magnitude and the sign may be coded separately.

The signaling may be placed in the attribute data unit header, also referred to as an attribute slice header (ASH). In this case, k values (either direct coded or difference coded) can be coded with se(v), meaning the values may be coded as a signed integer 0-th order Exp-Golomb-coded syntax element with the left bit first. To parse k values, G-PCC decoder 300 may require information identifying the number of LODs. In G-PCC, the number of LOD's (LOD1) may be signaled in an Attribute Parameter set (APS). However, the actual number of LODs (LOD2) may in some instances only be derived after LOD reconstruction and may be smaller compared to #LOD1. For example, LOD1 equals 12 while LOD2 equals 10. That is, some slices may have points so sparsely arranged or with so few points that not all LODs can be generated. For instance, in an example coding scenario, LoD1 may equal 12, and LOD2 may equal 10. To avoid the parsing dependency (on LOD reconstruction), G-PCC encoder 200 may be configured to signal, e.g., always signal, LOD1 scale values instead of LOD2 values, whereas the last (LOD1-LOD2) values may be signaled as zeros, as such values may not be used for the decoding processes (attribute reconstruction).

G-PCC encoder 200 may signal k at a slice level, rather than at a LOD level. Such signaling at the slice level may simplify the decoding process and may also reduce signaling overhead.

The example techniques (e.g., coding tools utilized for lifting transform or inverse transform) may produce a significant gain when coding the last component, for example, the Cr component, because predicting $Res_{Cr}$ may reduce the residual energy of Cr component. A quantization parameter (QP) offset may be applied to the (e.g., a subset of) secondary components to balance the improvements over all of the components. The example techniques may also be applied to generic multi-dimensional attributes, where the components, i.e., the component which is being predicted and the component which acts as a predictor, may be signaled explicitly in a slice header or attribute/sequence parameter sets.

In accordance with the techniques described above, G-PCC encoder 200 may be configured to determine, for a point of a point cloud, a first attribute value for a first color component, such as a Cb component, and encode the first attribute value for the first color component as a first predicted value and a first residual value. G-PCC encoder 200 may determine, for the point of the point cloud, a second attribute value for a second color component, such as a Cr component. G-PCC encoder 200 may determine a second predicted value for the second attribute value for the second color component. G-PCC encoder 200 may determine a second residual value, such as Res'Cr above, for the second attribute value for the second color component. G-PCC encoder 200 may apply a scaling factor that has one or both of a non-integer value or an absolute value greater than one to the first residual value to determine a predicted second residual value. The scaling factor may, for example, be applied by a multiplication by a scalar value, such as k above, and by a bit shift operation, such as >>b described above. G-PCC encoder 200 may generate, for inclusion in the point cloud data, a syntax element representing a difference between the second residual value and the predicted second residual value. This difference may, for example, correspond to ResCr described above.

In accordance with the techniques described above, G-PCC decoder 300 may be configured to determine, for a point of a point cloud, a first attribute value for a first color component based on a first predicted value and a first residual value. The first color component may, for example, be a Cb component and the first residual value may correspond to ResCb described above. G-PCC decoder 300 may apply a scaling factor that has one or both of a non-integer value or an absolute value greater than one to the first residual value to determine a predicted second residual value. The scaling factor may, for example, be applied by a multiplication by a scalar value, such as k above, and by a bit shift operation, such as >>b described above. For the point of the point cloud, G-PCC decoder 300 may receive in the encoded point cloud data a second residual value, such as ResCr described above, and determine a final second residual value (e.g., Res'Cr described above) based on the predicted second residual value and the received second residual value. Based on a second predicted value and the final second residual value, G-PCC decoder 300 may determine a second attribute value for a second color component, such as a Cr component.

Figure 4:
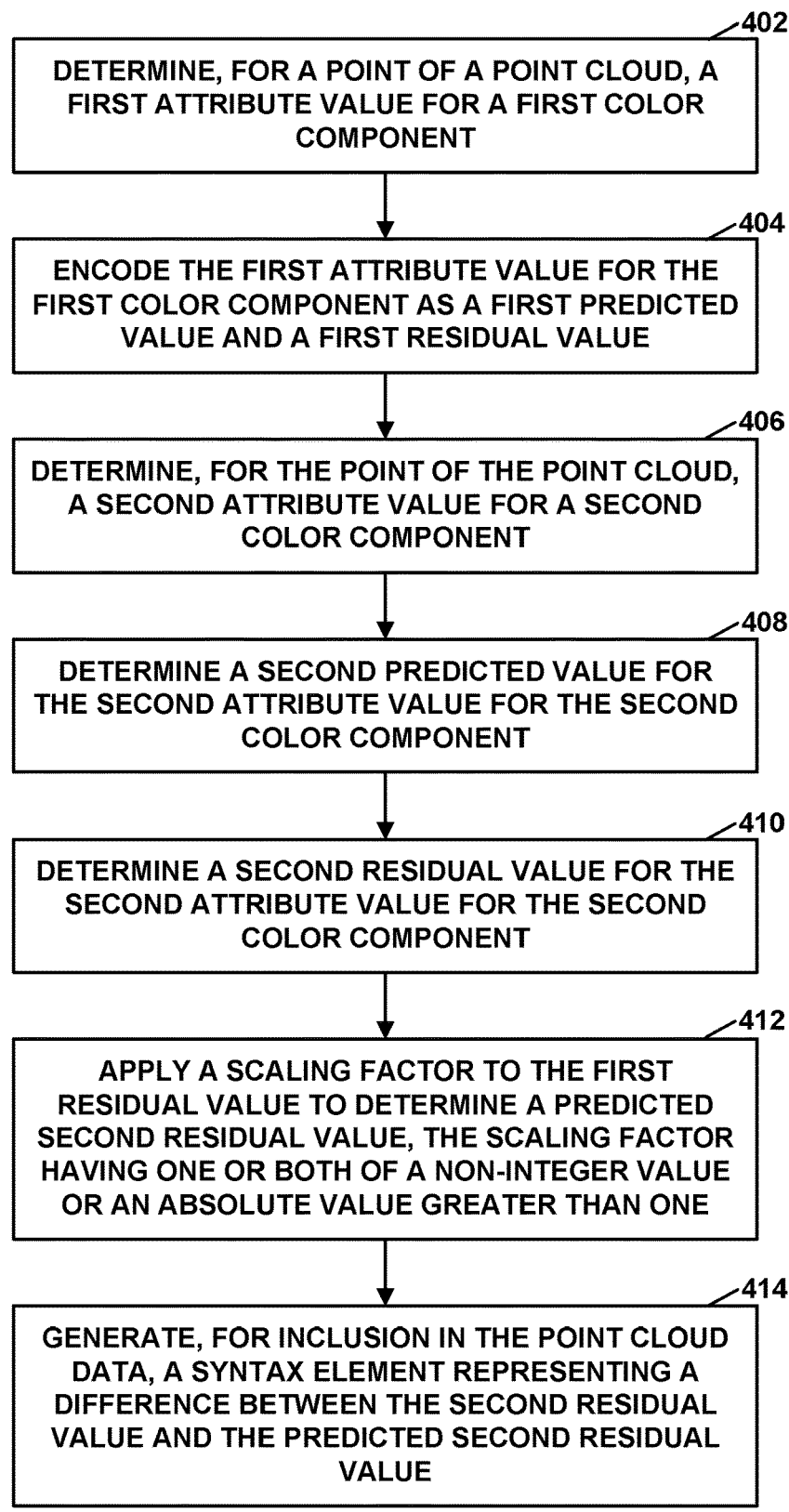
FIG. 4 is a flowchart illustrating an example operation of a G-PCC encoder in accordance with one or more techniques of this disclosure.

FIG. 4 is a flowchart illustrating an example operation of G-PCC encoder 200 in accordance with one or more techniques of this disclosure. G-PCC encoder 200 determines, for a point of a point cloud, a first attribute value for a first color component (402). G-PCC encoder 200 encodes the first attribute value for the first color component as a first predicted value and a first residual value (404). The first color component may, for example, be a first chroma color component, such as a Cb component.

G-PCC encoder 200 determines, for the point of the point cloud, a second attribute value for a second color component (406). The second color component may, for example, be a second chroma color component, such as a Cr component.

G-PCC encoder 200 determines a second predicted value for the second attribute value for the second color component (408). G-PCC encoder 200 may, for example, determine the second predicted value for the point of the point cloud based on value for one or more different points, such as neighboring points, of the point cloud. G-PCC encoder 200 may, for example, determine the second predicted value as a weighted average of attributed values for previously decoded points. G-PCC encoder 200 determines a second residual value for the second attribute value for the second color component (410). The second residual value may, for example, be a difference between the second attribute value and the second predicted value.

In this example, G-PCC encoder 200 applies a scaling factor to the first residual value to determine a predicted second residual value, the scaling factor having one or both of a non-integer value or an absolute value greater than one (412). G-PCC encoder 200 may, for example, determine and generate, for inclusion in the point cloud data, a syntax element for determining a scalar value that is an integer value. To generate the scalar value, G-PCC encoder 200 may generate a difference value corresponding to a difference between the scalar value and a previously determined scalar value and include in the point cloud data, a variable length syntax element indicating the difference value. The previously determined scalar value may, for example, be a scalar value for a different level of detail than the level of detail for the point cloud. G-PCC encoder 200 may include the scalar value in a syntax structure such as an attribute slice header. To apply the scaling factor, G-PCC encoder 200 may perform a multiplication by the scalar value and perform a bit shift operation. The bit shift operation may, for example, be a right shift by a value determined based on an accuracy of the scaling factor, such as 2.

G-PCC encoder 200 generates, for inclusion in the point cloud data, a syntax element representing a difference between the second residual value and the predicted second residual value (414).

Figure 5:
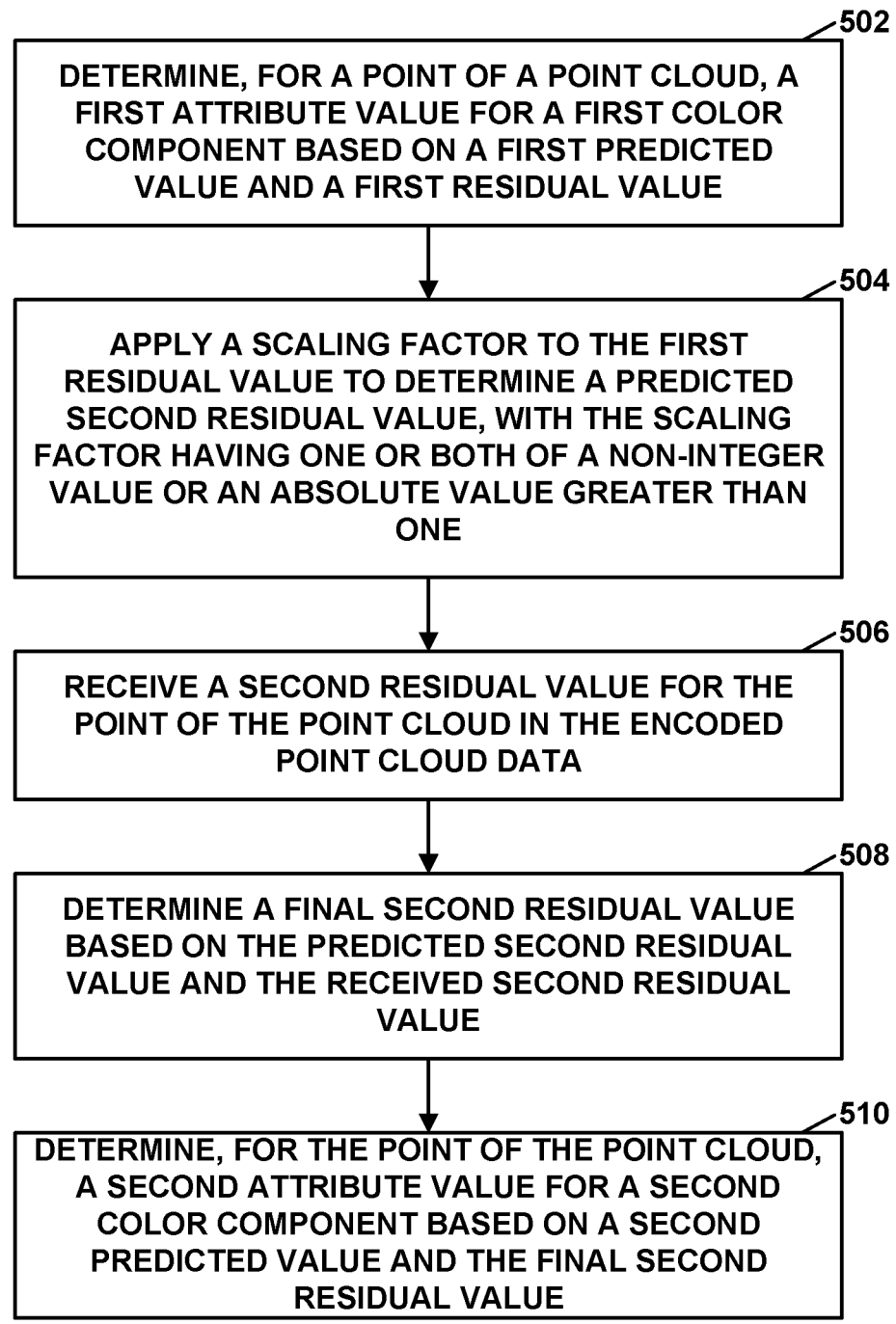
FIG. 5 is a flowchart illustrating an example operation of a G-PCC decoder in accordance with one or more techniques of this disclosure.

FIG. 5 is a flowchart illustrating an example operation of G-PCC decoder 300 in accordance with one or more techniques of this disclosure. In the example of FIG. 5, G-PCC decoder 300 determines, for a point of a point cloud, a first attribute value for a first color component based on a first predicted value and a first residual value (502). The first color component may, for example, be a first chroma color component, such as a Cb component.

G-PCC decoder 300 applies a scaling factor to the first residual value to determine a predicted second residual value, with the scaling factor having one or both of a non-integer value or an absolute value greater than one (504). That is, in addition to scaling factors of −1, 0, and 1, the scaling factor may also have fractional values between −1 and 1 and may also have both integer and fractional values with a magnitude of greater than 1. G-PCC decoder 300 may, for example, receive, in the point cloud data, as part of a syntax structure such as an attribute slice header, a syntax element for determining a scalar value that is an integer value and apply the scaling factor by performing a multiplication by the scalar value and performing a bit shift operation. The bit shift operation may, for example, be a right shift by a value determined based on an accuracy of the scaling factor, such as 2. G-PCC decoder 300 may, for example, receive a variable length syntax element indicating a difference value corresponding to a difference between the scalar value and a previously determined scalar value from a different level of detail than the level of detail that includes the point cloud.

In this example, G-PCC decoder 300 receives a second residual value for the point of the point cloud in the encoded point cloud data (506) and determines a final second residual value based on the predicted second residual value and the received second residual value (508). The final second residual value may, for example, be the sum of the received second residual value and the predicted second residual value.

G-PCC decoder 300 determines, for the point of the point cloud, a second attribute value for a second color component based on a second predicted value and the final second residual value (510). G-PCC decoder 300 may, for example, determine the second predicted value for the point of the point cloud based on values for one or more different points of the point cloud. G-PCC decoder 300 may, for example, determine the second predicted value as a weighted average of attributed values for previously decoded points. The second color component may, for example, be a second chroma color component, such as a Cr component. G-PCC decoder 300 may also determine a third attribute value for a third color component, such as a luma color component, for the point of the point cloud. Based on the first attribute value for the first color component, the second attribute value for the second color component, and the third attribute value for the third color component, G-PCC decoder 300 may reconstruct the point cloud.

Figure 6:
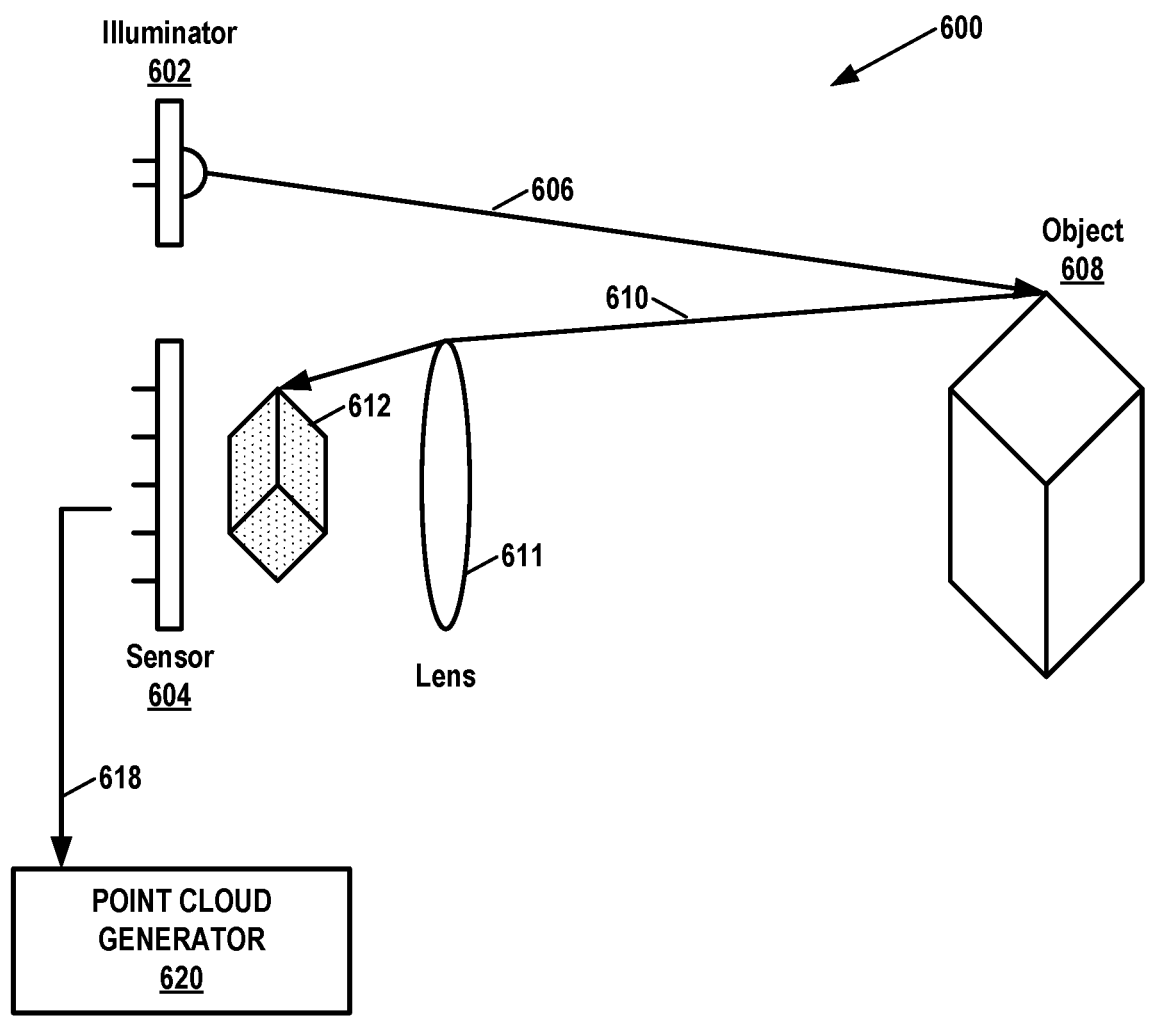
FIG. 6 is a conceptual diagram illustrating an example range-finding system that may be used with one or more techniques of this disclosure.

FIG. 6 is a conceptual diagram illustrating an example range-finding system 600 that may be used with one or more techniques of this disclosure. In the example of FIG. 6, range-finding system 600 includes an illuminator 602 and a sensor 604. Illuminator 602 may emit light 606. In some examples, illuminator 602 may emit light 606 as one or more laser beams. Light 606 may be in one or more wavelengths, such as an infrared wavelength or a visible light wavelength. In other examples, light 606 is not coherent, laser light. When light 606 encounters an object, such as object 608, light 606 creates returning light 610. Returning light 610 may include backscattered and/or reflected light. Returning light 610 may pass through a lens 611 that directs returning light 610 to create an image 612 of object 608 on sensor 604. Sensor 604 generates signals 618 based on image 612. Image 612 may comprise a set of points (e.g., as represented by dots in image 612 of FIG. 6).

In some examples, illuminator 602 and sensor 604 may be mounted on a spinning structure so that illuminator 602 and sensor 604 capture a 360-degree view of an environment. In other examples, range-finding system 600 may include one or more optical components (e.g., mirrors, collimators, diffraction gratings, etc.) that enable illuminator 602 and sensor 604 to detect objects within a specific range (e.g., up to 360-degrees). Although the example of FIG. 6 only shows a single illuminator 602 and sensor 604, range-finding system 600 may include multiple sets of illuminators and sensors.

In some examples, illuminator 602 generates a structured light pattern. In such examples, range-finding system 600 may include multiple sensors 604 upon which respective images of the structured light pattern are formed. Range-finding system 600 may use disparities between the images of the structured light pattern to determine a distance to an object 608 from which the structured light pattern backscatters. Structured light-based range-finding systems may have a high level of accuracy (e.g., accuracy in the sub-millimeter range), when object 608 is relatively close to sensor 604 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 600 is a time of flight (ToF)-based system. In some examples where range-finding system 600 is a ToF-based system, illuminator 602 generates pulses of light. In other words, illuminator 602 may modulate the amplitude of emitted light 606. In such examples, sensor 604 detects returning light 610 from the pulses of light 606 generated by illuminator 602. Range-finding system 600 may then determine a distance to object 608 from which light 606 backscatters based on a delay between when light 606 was emitted and detected and the known speed of light in air). In some examples, rather than (or in addition to) modulating the amplitude of the emitted light 606, illuminator 602 may modulate the phase of the emitted light 606. In such examples, sensor 604 may detect the phase of returning light 610 from object 608 and determine distances to points on object 608 using the speed of light and based on time differences between when illuminator 602 generated light 606 at a specific phase and when sensor 604 detected returning light 610 at the specific phase.

In other examples, a point cloud may be generated without using illuminator 602. For instance, in some examples, sensor 604 of range-finding system 600 may include two or more optical cameras. In such examples, range-finding system 600 may use the optical cameras to capture stereo images of the environment, including object 608. Range-finding system 600 (e.g., point cloud generator 620) may then calculate the disparities between locations in the stereo images. Range-finding system 600 may then use the disparities to determine distances to the locations shown in the stereo images. From these distances, point cloud generator 620 may generate a point cloud.

Sensors 604 may also detect other attributes of object 608, such as color and reflectance information. In the example of FIG. 6, a point cloud generator 620 may generate a point cloud based on signals 618 generated by sensor 604. Range-finding system 600 and/or point cloud generator 620 may form part of data source 104 (FIG. 1).

Figure 7:
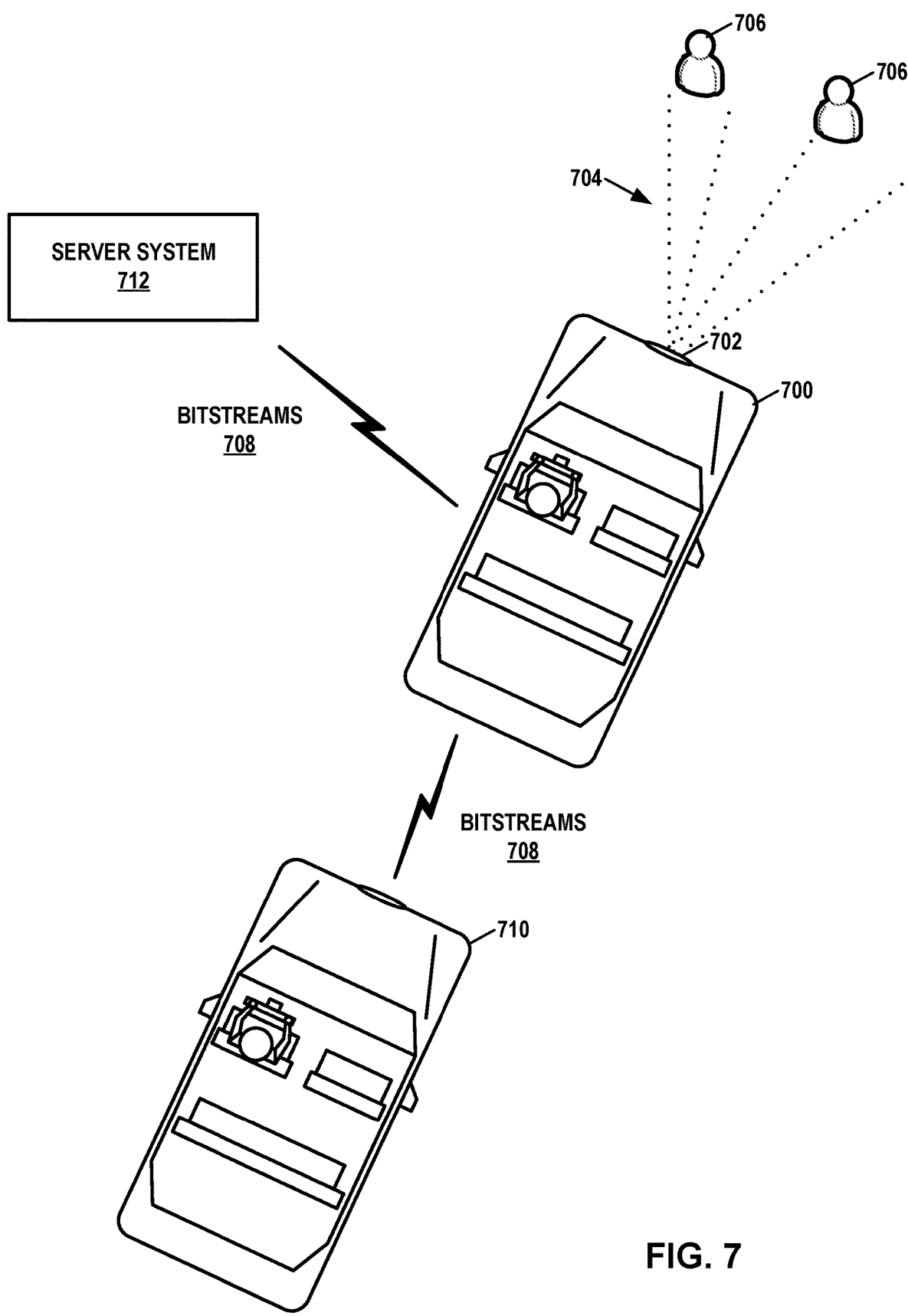
FIG. 7 is a conceptual diagram illustrating an example vehicle-based scenario in which one or more techniques of this disclosure may be used.

FIG. 7 is a conceptual diagram illustrating an example vehicle-based scenario in which one or more techniques of this disclosure may be used. In the example of FIG. 7, a vehicle 700 includes a laser package 702, such as a LIDAR system. Although not shown in the example of FIG. 7, vehicle 700 may also include a data source and a G-PCC encoder, such as G-PCC encoder 200 (FIG. 1). In the example of FIG. 7, laser package 702 emits laser beams 704 that reflect off pedestrians 706 or other objects in a roadway. The data source of vehicle 700 may generate a point cloud based on signals generated by laser package 702. The G-PCC encoder of vehicle 700 may encode the point cloud to generate bitstreams 708. Bitstreams 708 may include many fewer bits than the unencoded point cloud obtained by the G-PCC encoder. An output interface of vehicle 700 (e.g., output interface 108 (FIG. 1) may transmit bitstreams 708 to one or more other devices. Thus, vehicle 700 may be able to transmit bitstreams 708 to other devices more quickly than the unencoded point cloud data. Additionally, bitstreams 708 may require less data storage capacity.

In the example of FIG. 7, vehicle 700 may transmit bitstreams 708 to another vehicle 710. Vehicle 710 may include a G-PCC decoder, such as G-PCC decoder 300 (FIG. 1). The G-PCC decoder of vehicle 710 may decode bitstreams 708 to reconstruct the point cloud. Vehicle 710 may use the reconstructed point cloud for various purposes. For instance, vehicle 710 may determine based on the reconstructed point cloud that pedestrians 706 are in the roadway ahead of vehicle 700 and therefore start slowing down, e.g., even before a driver of vehicle 710 realizes that pedestrians 706 are in the roadway. Thus, in some examples, vehicle 710 may perform an autonomous navigation operation, generate a notification or warning, or perform another action based on the reconstructed point cloud.

Additionally or alternatively, vehicle 700 may transmit bitstreams 708 to a server system 712. Server system 712 may use bitstreams 708 for various purposes. For example, server system 712 may store bitstreams 708 for subsequent reconstruction of the point clouds. In this example, server system 712 may use the point clouds along with other data (e.g., vehicle telemetry data generated by vehicle 700) to train an autonomous driving system. In other example, server system 712 may store bitstreams 708 for subsequent reconstruction for forensic crash investigations (e.g., if vehicle 700 collides with pedestrians 706) or may transmit notifications or instructions for navigation to vehicle 700 or vehicle 710.

Figure 8:
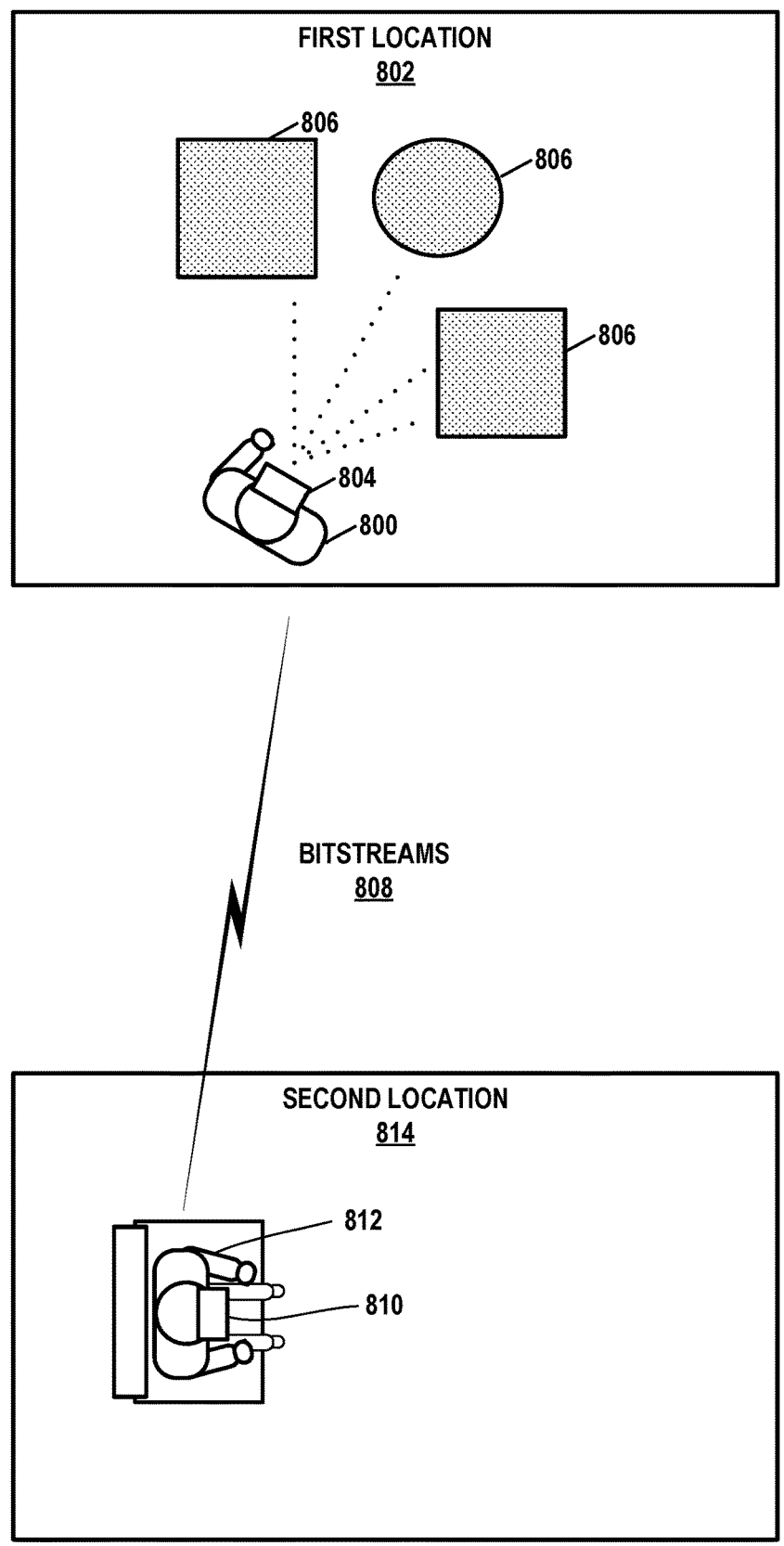
FIG. 8 is a conceptual diagram illustrating an example extended reality system in which one or more techniques of this disclosure may be used.

FIG. 8 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 8, a first user 800 is located in a first location 802. User 800 wears an XR headset 804. As an alternative to XR headset 804, user 800 may use a mobile device (e.g., mobile phone, tablet computer, etc.). XR headset 804 includes a depth detection sensor, such as a LIDAR system, that detects positions of points on objects 806 at first location 802. A data source of XR headset 804 may use the signals generated by the depth detection sensor to generate a point cloud representation of objects 806 at location 802. XR headset 804 may include a G-PCC encoder (e.g., G-PCC encoder 200 of FIG. 1) that is configured to encode the point cloud to generate bitstreams 808.

XR headset 804 may transmit bitstreams 808 (e.g., via a network such as the Internet) to an XR headset 810 worn by a user 812 at a second location 814. XR headset 810 may decode bitstreams 808 to reconstruct the point cloud. XR headset 810 may use the point cloud to generate an XR visualization (e.g., an AR, MR, VR visualization) representing objects 806 at location 802. Thus, in some examples, such as when XR headset 810 generates a VR visualization, user 812 at location 814 may have a 3D immersive experience of location 802. In some examples, XR headset 810 may determine a position of a virtual object based on the reconstructed point cloud. For instance, XR headset 810 may determine, based on the reconstructed point cloud, that an environment (e.g., location 802) includes a flat surface and then determine that a virtual object (e.g., a cartoon character) is to be positioned on the flat surface. XR headset 810 may generate an XR visualization in which the virtual object is at the determined position. For instance, XR headset 810 may show the cartoon character sitting on the flat surface.

Figure 9:
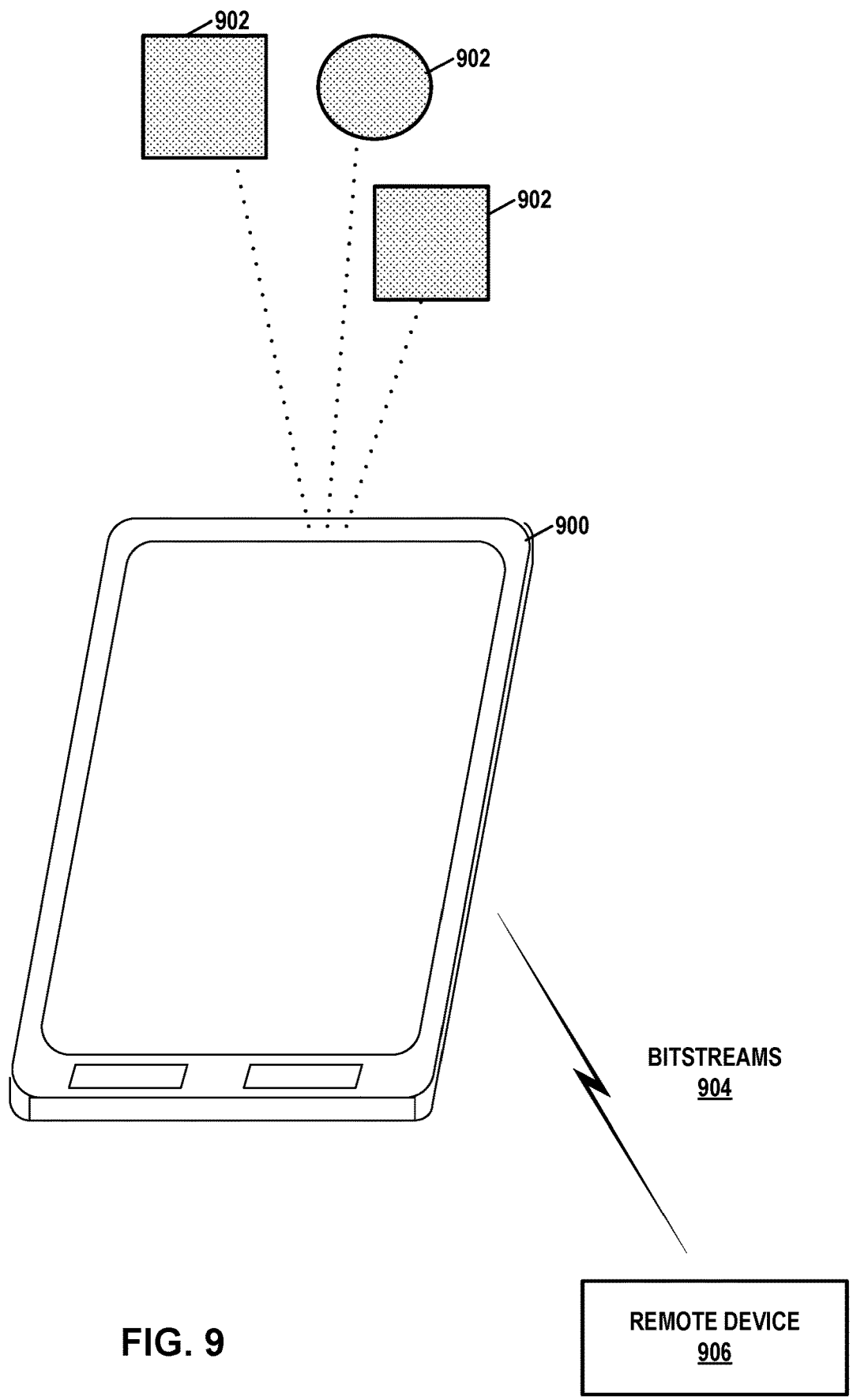
FIG. 9 is a conceptual diagram illustrating an example mobile device system in which one or more techniques of this disclosure may be used.

FIG. 9 is a conceptual diagram illustrating an example mobile device system in which one or more techniques of this disclosure may be used. In the example of FIG. 9, a mobile device 900, such as a mobile phone or tablet computer, includes a depth detection sensor, such as a LIDAR system, that detects positions of points on objects 902 in an environment of mobile device 900. A data source of mobile device 900 may use the signals generated by the depth detection sensor to generate a point cloud representation of objects 902. Mobile device 900 may include a G-PCC encoder (e.g., G-PCC encoder 200 of FIG. 1) that is configured to encode the point cloud to generate bitstreams 904. In the example of FIG. 9, mobile device 900 may transmit bitstreams to a remote device 906, such as a server system or other mobile device. Remote device 906 may decode bitstreams 904 to reconstruct the point cloud. Remote device 906 may use the point cloud for various purposes. For example, remote device 906 may use the point cloud to generate a map of environment of mobile device 900. For instance, remote device 906 may generate a map of an interior of a building based on the reconstructed point cloud. In another example, remote device 906 may generate imagery (e.g., computer graphics) based on the point cloud. For instance, remote device 906 may use points of the point cloud as vertices of polygons and use color attributes of the points as the basis for shading the polygons. In some examples, remote device 906 may perform facial recognition using the point cloud.

Examples in the various aspects of this disclosure may be used individually or in any combination.

The following numbered clauses illustrate one or more aspects of the devices and techniques described in this disclosure.

Clause 1A. A method of decoding point cloud data, the method comprising: determining one or more values indicative of a relationship between a first coefficient of a first color component and a second coefficient of a second color component of the point cloud data, wherein the one or more values comprise one or more values from a range of values that include values in addition to or instead of −1, 0, and 1; determining at least one of the first coefficient or the second coefficient based on the one or more values; and reconstructing the point cloud data based on at least one of the determined first coefficient or the determined second coefficient.

Clause 2A. The method of clause 1A, wherein the first coefficient and the second coefficient are lifting coefficients for a lifting inverse transform to generate values for the first color component and the second color component respectively.

Clause 3A. The method of any of clauses 1A and 2A, wherein the first color component is one of Cb component or Cr component, and the second color component is the other one of the Cb component or the Cr component.

Clause 4A. The method of any of clauses 1A-3A, wherein the range of values comprise any value with a fractional accuracy of p, wherein p is at least one of a fixed value, an inferred value, or a received value.

Clause 5A. The method of any of clauses 1A-3A, wherein the range of values comprise any value within range of [−a, +a] with an accuracy of p, wherein a and p are at least one of a fixed value, an inferred value, or a received value.

Clause 6A. The method of any of clauses 4A and 5A, wherein a value of p is equal to $\frac{1}{2}^{b}$, b is an integer.

Clause 7A. The method of any of clauses 1A-6A, wherein determining one or more values comprises receiving the one or more values.

Clause 8A. The method of any of clauses 1A-7A, further comprising presenting imagery based on the point cloud.

Clause 9A. A method of encoding point cloud data, the method comprising: determining at least one of a first coefficient of a first color component and a second coefficient of a second color component of the point cloud data; determining one or more values indicative of a relationship between the first coefficient of the first color component and the second coefficient of the second color component, wherein the one or more values comprise one or more values from a range of values that include values in addition to or instead of −1, 0, and 1; signaling the determined one or more values.

Clause 10A. The method of clause 9A, wherein the first coefficient and the second coefficient are lifting coefficients for a lifting transform to transform values for the first color component and the second color component respectively.

Clause 11A. The method of any of clauses 9A and 10A, wherein the first color component is one of Cb component or Cr component, and the second color component is the other one of the Cb component or the Cr component.

Clause 12A. The method of any of clauses 9A-11A, wherein the range of values comprise any value with a fractional accuracy of p, wherein p is at least one of a fixed value, an inferred value, or a signaled value.

Clause 13A. The method of any of clauses 9A-11A, wherein the range of values comprise any value within range of [−a, +a] with an accuracy of p, wherein a and p are at least one of a fixed value, an inferred value, or a signaled value.

Clause 14A. The method of any of clauses 12A and 13A, wherein a value of p is equal to $\frac{1}{2^b}$, b is an integer.

Clause 15A. The method of any of clauses 9A-14A, further comprising generating the point cloud.

Clause 16A. A device for decoding point cloud data, the device comprising: a memory configured to store point cloud data; and a processor coupled to the memory and comprising at least one of fixed function or programmable circuitry, wherein the processors is configured to perform the method of any of clauses 1A-8A.

Clause 17A. The device of clause 16A, wherein the device comprises a decoder.

Clause 18A. The device of any of clauses 16A and 17A, further comprising a display to present imagery based on the point cloud.

Clause 19A. A device for encoding point cloud data, the device comprising: a memory configured to store point cloud data; and a processor coupled to the memory and comprising at least one of fixed function or programmable circuitry, wherein the processors is configured to perform the method of any of clauses 9A-15A.

Clause 20A. The device of clause 19A, wherein the device comprises an encoder.

Clause 21A. A device for decoding point cloud data, the device comprising means for performing the method of any of clauses 1A-8A.

Clause 22A. A device for encoding point cloud data, the device comprising means for performing the method of any of clauses 9A-15A.

Clause 23A. A computer-readable storage medium storing instructions thereon that when executed cause one or more processors to perform the method of any of clauses 1-8.

Clause 24A. A computer-readable storage medium storing instructions thereon that when executed cause one or more processors to perform the method of any of clauses 9A-15A.

Clause 25A. A device for decoding encoded point cloud data, the device comprising: a memory configured to store the encoded point cloud data; and one or more processors coupled to the memory, implemented in circuitry, and configured to: for a point of a point cloud, determine a first attribute value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second attribute value for a second color component based on a second predicted value and the final second residual value.

Clause 26A. The device of clause 25A, wherein the one or more processors are further configured to: receive, in the point cloud data, a syntax element for determining a scalar value, wherein the scalar value is an integer value, and wherein to apply the scaling factor, the one or more processors are further configured to perform a multiplication by the scalar value and perform a bit shift operation.

Clause 27A. The device of clause 26A, wherein to perform the bit shift operation, the one or more processors are further configured to perform a right shift by 2.

Clause 28A. The device of clause 26A, wherein the syntax element for determining the scalar value indicates a difference value corresponding to a difference between the scalar value and a previously determined scalar value.

Clause 29A. The device of clause 28A, wherein the syntax element for determining the scalar value comprises a variable length syntax element indicating the difference value.

Clause 30A. The device of clause 28A, wherein the point cloud comprises a point cloud for a first level of detail and the previously determined scalar value is for a second level of detail that is different than the first level of detail.

Clause 31A. The device of clause 26A, wherein to receive the syntax element for determining the scalar value, the one or more processors are further configured to receive the syntax element for determining the scalar value in an attribute slice header syntax structure.

Clause 32A. The device of clause 25A, wherein the one or more processors are further configured to: determine the second predicted value for the point of the point cloud based on values for one or more different points of the point cloud.

Clause 33A. The device of clause 25A, wherein to determine the scaling factor, the one or more processors are further configured to determine the scaling factor based on a scaling factor for a second level of detail.

Clause 34A. The device of clause 25A, wherein the first color component comprises a first chroma color component and the second color component comprises a second chroma color component.

Clause 35A. The device of clause 34A, wherein the one or more processors are further configured to: for the point of the point cloud, determine a third attribute value for a third color component, wherein the third color component comprises a luma color component.

Clause 36A. The device of clause 25A, wherein the one or more processors are further configured to reconstruct the point cloud.

Clause 37A. The device of clause 36A, wherein the one or more processors are further configured to generate a map of an interior of a building based on the reconstructed point cloud.

Clause 38A. The device of clause 36A, wherein the one or more processors are further configured to perform an autonomous navigation operation based on the reconstructed point cloud.

Clause 39A. The device of clause 36A, wherein the one or more processors are further configured to generate computer graphics based on the reconstructed point cloud.

Clause 40A. The device of clause 36, wherein the one or more processors are configured to: determine a position of a virtual object based on the reconstructed point cloud; and generate an extended reality (XR) visualization in which the virtual object is at the determined position.

Clause 41A. The device of clause 36A, further comprising a display to present imagery based on the reconstructed point cloud.

Clause 42A. The device of clause 25A, wherein the device is one of a mobile phone or tablet computer.

Clause 43A. The device of clause 25A, wherein the device is a vehicle.

Clause 44A. The device of clause 25A, wherein the device is an extended reality device.

Clause 45A. A method of decoding encoded point cloud data, the method comprising: for a point of a point cloud, determining a first attribute value for a first color component based on a first predicted value and a first residual value; applying a scaling factor to the first residual value to determine a predicted second residual value, wherein the scaling factor has one or both of a non-integer value or an absolute value greater than one; for the point of the point cloud, receiving a second residual value in the encoded point cloud data; determining a final second residual value based on the predicted second residual value and the received second residual value; and for the point of the point cloud, determining a second attribute value for a second color component based on a second predicted value and the final second residual value.

Clause 46A. The method of clause 45A, further comprising: receiving, in the point cloud data, a syntax element for determining a scalar value, wherein the scalar value is an integer value, and wherein applying the scaling factor comprises performing a multiplication by the scalar value and performing a bit shift operation.

Clause 47A. The method of clause 46A, wherein performing the bit shift operation comprises performing a right shift by 2.

Clause 48A. The method of clause 46A, wherein receiving the syntax element for determining the scalar value indicates a difference value corresponding to a difference between the scalar value and a previously determined scalar value.

Clause 49A. The method of clause 48A, wherein the syntax element for determining the scalar value comprises a variable length syntax element indicating the difference value.

Clause 50A. The method of clause 48A, wherein the point cloud comprises a point cloud for a first level of detail and the previously determined scalar value is for a second level of detail that is different than the first level of detail.

Clause 51A. The method of clause 46A, wherein receiving the syntax element for determining the scalar value comprises receiving the syntax element for determining the scalar value in an attribute slice header syntax structure.

Clause 52A. The method of clause 45A, further comprising: determining the second predicted value for the point of the point cloud based on values for one or more different points of the point cloud.

Clause 53A. The method of clause 45A, wherein determining the scaling factor comprises determining the scaling factor based on a scaling factor for a second level of detail.

Clause 54A. The method of clause 45A, wherein the first color component comprises a first chroma color component and the second color component comprises a second chroma color component.

Clause 55A. The method of clause 54A, further comprising: for the point of the point cloud, determining a third attribute value for a third color component, wherein the third color component comprises a luma color component.

Clause 56A. A device for encoding point cloud data, the device comprising: a memory configured to store the encoded point cloud data; and one or more processors coupled to the memory, implemented in circuitry, and configured to: for a point of a point cloud, determine a first attribute value for a first color component; encode the first attribute value for the first color component as a first predicted value and a first residual value; for the point of the point cloud, determine a second attribute value for a second color component; determine a second predicted value for the second attribute value for the second color component; determine a second residual value for the second attribute value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

Clause 57A. The device of clause 56A, wherein the one or more processors are further configured to: generate, for inclusion in the point cloud data, a syntax element for determining a scalar value, wherein the scalar value is an integer value, and wherein applying the scaling factor comprises performing a multiplication by the scalar value and performing a bit shift operation.

Clause 58A. The device of clause 57A, wherein to perform the bit shift operation, the one or more processors are further configured to perform a right shift by 2.

Clause 59A. The device of clause 57A, wherein the syntax element for determining the scalar value indicates a difference value corresponding to a difference between the scalar value and a previously determined scalar value.

Clause 60A. The device of clause 59A, wherein the syntax element for determining the scalar value comprises a variable length syntax element indicating the difference value.

Clause 61A. The device of clause 57A, wherein the point cloud comprises a point cloud for a first level of detail and the previously determined scalar value is for a second level of detail that is different than the first level of detail.

Clause 62A. The device of clause 57A, wherein to generate the syntax element for determining the scalar value, the one or more processors are further configured to include the syntax element for determining the scalar value in an attribute slice header syntax structure.

Clause 63A. The device of clause 56A, wherein the one or more processors are further configured to: determine the second predicted value for the point of the point cloud based on values for one or more different points of the point cloud.

Clause 64A. The device of clause 56A, wherein to determine the scaling factor, the one or more processors are further configured to determine the scaling factor based on a scaling factor for a second level of detail.

Clause 65A. The device of clause 56A, wherein the first color component comprises a first chroma color component and the second color component comprises a second chroma color component.

Clause 66A. The device of clause 65A, wherein the one or more processors are further configured to: for the point of the point cloud, determine a third attribute value for a third color component, wherein the third color component comprises a luma color component.

Clause 67A. The device of clause 56A, further comprising a sensor to generate the point cloud data.

Clause 68A. A method of encoding point cloud data, the method comprising: for a point of a point cloud, determining a first attribute value for a first color component; encoding the first attribute value for the first color component as a first predicted value and a first residual value; for the point of the point cloud, determining a second attribute value for a second color component; determining a second predicted value for the second attribute value for the second color component; determining a second residual value for the second attribute value for the second color component; applying a scaling factor to the first residual value to determine a predicted second residual value, wherein the scaling factor has one or both of a non-integer value or an absolute value greater than one; and generating, for inclusion in the point cloud data, a syntax element representing a difference between the second residual value and the predicted second residual value.

Clause 69A. The method of clause 44A, further comprising: generating, for inclusion in the point cloud data, a syntax element for determining a scalar value, wherein the scalar value is an integer value, and wherein applying the scaling factor comprises performing a multiplication by the scalar value and performing a bit shift operation.

Clause 70A. The method of clause 45A, wherein performing the bit shift operation comprises performing a right shift by 2.

Clause 71A. The method of clause 45A, wherein the syntax element for determining the scalar value indicates a difference value corresponding to a difference between the scalar value and a previously determined scalar value.

Clause 72A. The method of clause 47A, wherein the syntax element for determining the scalar value comprises a variable length syntax element indicating the difference value.

Clause 73A. The method of clause 45A, wherein the point cloud comprises a point cloud for a first level of detail and the previously determined scalar value is for a second level of detail that is different than the first level of detail.

Clause 74A. The method of clause 45A, wherein generating the syntax element for determining the scalar value comprises including the syntax element for determining the scalar value in an attribute slice header syntax structure.

Clause 75A. The method of clause 44A, further comprising: determining the second predicted value for the point of the point cloud based on values for one or more different points of the point cloud.

Clause 76A. The method of clause 44A, wherein determining the scaling factor comprises determining the scaling factor based on a scaling factor for a second level of detail.

Clause 77A. The method of clause 44A, wherein the first color component comprises a first chroma color component and the second color component comprises a second chroma color component.

Clause 78A. The method of clause 53A, further comprising: for the point of the point cloud, determining a third attribute value for a third color component, wherein the third color component comprises a luma color component.

Clause 79A. A computer-readable storage medium storing instructions that when executed by one or more processors cause the one or more processors to: for a point of a point cloud, determine a first attribute value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second attribute value for a second color component based on a second predicted value and the final second residual value.

Clause 80A. A computer-readable storage medium storing instructions that when executed by one or more processors cause the one or more processors to: for a point of a point cloud, determine a first attribute value for a first color component; encode the first attribute value for the first color component as a first predicted value and a first residual value; for the point of the point cloud, determine a second attribute value for a second color component; determine a second predicted value for the second attribute value for the second color component; determine a second residual value for the second attribute value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

Clause 1B. A device for decoding encoded point cloud data, the device comprising: a memory configured to store the encoded point cloud data: one or more processors, implemented in circuitry, and configured to: for a point of a point cloud, determine a first attribute value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second attribute value for a second color component based on a second predicted value and the final second residual value.

Clause 2B. The device of clause 1B, wherein the one or more processors are further configured to: receive, in the point cloud data, the syntax element for determining the scalar value, wherein the scalar value is an integer value, and wherein to apply the scaling factor, the one or more processors are further configured to perform a multiplication by the scalar value and perform a bit shift operation.

Clause 3B. The device of clause 2B, wherein to perform the bit shift operation, the one or more processors are further configured to perform a right shift by 2.

Clause 4B. The device of clause 2B or 3B, wherein the syntax element for determining the scalar value indicates a difference value corresponding to a difference between the scalar value and a previously determined scalar value.

Clause 5B. The device of clause 4B, wherein the syntax element for determining the scalar value comprises a variable length syntax element indicating the difference value.

Clause 6B. The device of clause 4B or 5B, wherein the point cloud comprises a point cloud for a first level of detail and the previously determined scalar value is for a second level of detail that is different than the first level of detail.

Clause 7B. The device of any of clauses 2B-6B, wherein to receive the syntax element for determining the scalar value, the one or more processors are further configured to receive the syntax element for determining the scalar value in an attribute slice header syntax structure.

Clause 8B. The device of any of clauses 1B-7B, wherein the one or more processors are further configured to: determine the second predicted value for the point of the point cloud based on values for one or more different points of the point cloud.

Clause 9B. The device of any of clauses 1B-8B, wherein the point cloud comprises a point cloud for a first level of detail, and wherein to determine the scaling factor, the one or more processors are further configured to determine the scaling factor based on a scaling factor for a second level of detail that is different than the first level of detail.

Clause 10B. The device of any of clauses 1B-9B, wherein the first color component comprises a first chroma color component and the second color component comprises a second chroma color component.

Clause 11B. The device of clause 10B, wherein the one or more processors are further configured to: for the point of the point cloud, determine a third attribute value for a third color component, wherein the third color component comprises a luma color component.

Clause 12B. The device of any of clauses 1B-11B, wherein the one or more processors are further configured to reconstruct the point cloud.

Clause 13B. The device of clause 12B, wherein the one or more processors are further configured to generate a map of an interior of a building based on the reconstructed point cloud.

Clause 14B. The device of clause 12B, wherein the one or more processors are further configured to perform an autonomous navigation operation based on the reconstructed point cloud.

Clause 15B. The device of clause 12B, wherein the one or more processors are further configured to generate computer graphics based on the reconstructed point cloud.

Clause 16B. The device of clause 12B, wherein the one or more processors are configured to: determine a position of a virtual object based on the reconstructed point cloud; and generate an extended reality (XR) visualization in which the virtual object is at the determined position.

Clause 17B. The device of any of clauses 12B-16B, further comprising a display to present imagery based on the reconstructed point cloud.

Clause 18B. The device of any of clauses 1B-17B, wherein the device is one of a mobile phone or tablet computer.

Clause 19B. The device of any of clauses 1B-14B or 17B, wherein the device is a vehicle.

Clause 20B. The device of any of clauses 1B-19B, wherein the device is an extended reality device.

Clause 21B. A method of decoding encoded point cloud data, the method comprising: for a point of a point cloud, determining a first attribute value for a first color component based on a first predicted value and a first residual value; applying a scaling factor to the first residual value to determine a predicted second residual value, wherein the scaling factor has one or both of a non-integer value or an absolute value greater than one; for the point of the point cloud, receiving a second residual value in the encoded point cloud data; determining a final second residual value based on the predicted second residual value and the received second residual value; and for the point of the point cloud, determining a second attribute value for a second color component based on a second predicted value and the final second residual value.

Clause 22B. The method of clause 21B, further comprising: receiving, in the point cloud data, a syntax element for determining a scalar value, wherein the scalar value is an integer value, and wherein applying the scaling factor comprises performing a multiplication by the scalar value and performing a bit shift operation.

Clause 23B. The method of clause 22B, wherein performing the bit shift operation comprises performing a right shift by 2.

Clause 24B. The method of clause 22B or 23B, wherein the syntax element for determining the scalar value indicates a difference value corresponding to a difference between the scalar value and a previously determined scalar value.

Clause 25B. The method of clause 24B, wherein the syntax element for determining the scalar value comprises a variable length syntax element indicating the difference value.

Clause 26B. The method of clause 24B or 25B, wherein the point cloud comprises a point cloud for a first level of detail and the previously determined scalar value is for a second level of detail that is different than the first level of detail.

Clause 27B. The method of any of clauses 22B-26B, wherein receiving the syntax element for determining the scalar value comprises receiving the syntax element for determining the scalar value in an attribute slice header syntax structure.

Clause 28B. The method of any of clauses 21B-27B, further comprising: determining the second predicted value for the point of the point cloud based on values for one or more different points of the point cloud.

Clause 29B. The method of any of clauses 21B-28B, wherein determining the scaling factor comprises determining the scaling factor based on a scaling factor for a second level of detail.

Clause 30B. The method of any of clauses 21B-29B, wherein the first color component comprises a first chroma color component and the second color component comprises a second chroma color component.

Clause 31B. The method of clause 30B, further comprising: for the point of the point cloud, determining a third attribute value for a third color component, wherein the third color component comprises a luma color component.

Clause 32B. A device for encoding point cloud data, the device comprising: a memory configured to store the encoded point cloud data: one or more processors, implemented in circuitry, and configured to: for a point of a point cloud, determine a first attribute value for a first color component; encode the first attribute value for the first color component as a first predicted value and a first residual value; for the point of the point cloud, determine a second attribute value for a second color component; determine a second predicted value for the second attribute value for the second color component; determine a second residual value for the second attribute value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

Clause 33B. The device of clause 32B, wherein the one or more processors are further configured to: generate, for inclusion in the point cloud data, the syntax element for determining the scalar value, wherein the scalar value is an integer value, and wherein applying the scaling factor comprises performing a multiplication by the scalar value and performing a bit shift operation.

Clause 34B. The device of clause 33B, wherein to perform the bit shift operation, the one or more processors are further configured to perform a right shift by 2.

Clause 35B. The device of clause 33B or 34B, wherein the syntax element for determining the scalar value indicates a difference value corresponding to a difference between the scalar value and a previously determined scalar value.

Clause 36B. The device of clause 35B, wherein the syntax element for determining the scalar value comprises a variable length syntax element indicating the difference value.

Clause 37B. The device of any of clauses 33B-36B, wherein the point cloud comprises a point cloud for a first level of detail and the previously determined scalar value is for a second level of detail that is different than the first level of detail.

Clause 38B. The device of any of clauses 33B-38B, wherein to generate the syntax element for determining the scalar value, the one or more processors are further configured to include the syntax element for determining the scalar value in an attribute slice header syntax structure.

Clause 39B. The device of any of clauses 32B-38B, wherein the one or more processors are further configured to: determine the second predicted value for the point of the point cloud based on values for one or more different points of the point cloud.

Clause 40B. The device of any of clauses 32B-39B, wherein the point cloud comprises a point cloud for a first level of detail, and wherein to determine the scaling factor, the one or more processors are further configured to determine the scaling factor based on a scaling factor for a second level of detail that is different than the first level of detail.

Clause 41B. The device of any of clauses 32B-40B, wherein the first color component comprises a first chroma color component and the second color component comprises a second chroma color component.

Clause 42B. The device of clause 41B, wherein the one or more processors are further configured to: for the point of the point cloud, determine a third attribute value for a third color component, wherein the third color component comprises a luma color component.

Clause 43B. The device of any of clauses 32B-42B, further comprising a sensor to generate the point cloud data.

Clause 44B. A method of encoding point cloud data, the method comprising: for a point of a point cloud, determining a first attribute value for a first color component; encoding the first attribute value for the first color component as a first predicted value and a first residual value; for the point of the point cloud, determining a second attribute value for a second color component; determining a second predicted value for the second attribute value for the second color component; determining a second residual value for the second attribute value for the second color component; applying a scaling factor to the first residual value to determine a predicted second residual value, wherein the scaling factor has one or both of a non-integer value or an absolute value greater than one; and generating, for inclusion in the point cloud data, a syntax element representing a difference between the second residual value and the predicted second residual value.

Clause 45B. The method of clause 44B, further comprising: generating, for inclusion in the point cloud data, a syntax element for determining a scalar value, wherein the scalar value is an integer value, and wherein applying the scaling factor comprises performing a multiplication by the scalar value and performing a bit shift operation.

Clause 46B. The method of clause 45B, wherein performing the bit shift operation comprises performing a right shift by 2.

Clause 47B. The method of clause 45B or 46B, wherein the syntax element for determining the scalar value indicates a difference between the scalar value and a previously determined scalar value.

Clause 48B. The method of clause 47B, wherein the syntax element for determining the scalar value comprises a variable length syntax element indicating the difference value.

Clause 49B. The method of any of clauses 45B-48B, wherein the point cloud comprises a point cloud for a first level of detail and the previously determined scalar value is for a second level of detail that is different than the first level of detail.

Clause 50B. The method of any of clauses 45B-49B, wherein generating the syntax element for determining the scalar value comprises including the syntax element for determining the scalar value in an attribute slice header syntax structure.

Clause 51B. The method of any of clauses 44B-50B, further comprising: determining the second predicted value for the point of the point cloud based on values for one or more different points of the point cloud.

Clause 52B. The method of any of clauses 44B-51B, wherein determining the scaling factor comprises determining the scaling factor based on a scaling factor for a second level of detail.

Clause 53B. The method of any of clauses 44B-52B, wherein the first color component comprises a first chroma color component and the second color component comprises a second chroma color component.

Clause 54B. The method of clause 53B, further comprising: for the point of the point cloud, determining a third attribute value for a third color component, wherein the third color component comprises a luma color component.

Clause 55B. A computer-readable storage medium storing instructions that when executed by one or more processors cause the one or more processors to: for a point of a point cloud, determine a first attribute value for a first color component based on a first predicted value and a first residual value; apply a scaling factor to the first residual value to determine a predicted second residual value, wherein the scaling factor has one or both of a non-integer value or an absolute value greater than one; for the point of the point cloud, receive a second residual value in the encoded point cloud data; determine a final second residual value based on the predicted second residual value and the received second residual value; and for the point of the point cloud, determine a second attribute value for a second color component based on a second predicted value and the final second residual value.

Clause 56B. A computer-readable storage medium storing instructions that when executed by one or more processors cause the one or more processors to: for a point of a point cloud, determine a first attribute value for a first color component; encode the first attribute value for the first color component as a first predicted value and a first residual value; for the point of the point cloud, determine a second attribute value for a second color component; determine a second predicted value for the second attribute value for the second color component; determine a second residual value for the second attribute value for the second color component; apply a scaling factor to the first residual value to determine a predicted second residual value, wherein the scaling factor has one or both of a non-integer value or an absolute value greater than one; and generate, for inclusion in the point cloud data, a syntax element representing a difference between the second residual value and the predicted second residual value.

Clause 57B. A computer program product comprising computer executable instructions that when executed by one or more processors cause the one or more processors to perform the method of any of clauses 21B-31B.

Clause 58B. A computer program product comprising computer executable instructions that when executed by one or more processors cause the one or more processors to perform the method of any of clauses 44B-54B.

Examples in the various aspects of this disclosure may be used individually or in any combination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding encoded point cloud data to reconstruct a point cloud, the device comprising:
a memory configured to store the encoded point cloud data; and
one or more processors, implemented in circuitry, and configured to:
for a point of the point cloud determine a first attribute value for a first color component based on a first predicted value and a first residual value;
receive, in the encoded point cloud data, a syntax element indicating a scalar value, wherein the scalar value is an integer value;
apply a scaling factor to the first residual value to determine a predicted second residual value, wherein the scaling factor has a non-integer value, and wherein to apply the scaling factor to the first residual value, the one or more processors are further configured to:
perform a multiplication by the scalar value; and
perform a right shift operation, wherein a result of a combination of the multiplication by the scalar value and the right shift operation is equal to the scaling factor;
for the point of the point cloud, receive a second residual value in the encoded point cloud data;
determine a final second residual value based on the predicted second residual value and the received second residual value; and
for the point of the point cloud, determine a second attribute value for a second color component based on a second predicted value and the final second residual value.

2. The device of claim 1, wherein the right shift operation comprises a right shift by 2.

3. The device of claim 1, wherein the syntax element indicates a difference value corresponding to a difference between the scalar value and a previously determined scalar value.

4. The device of claim 3, wherein the syntax element comprises a variable length syntax element indicating the difference value.

5. The device of claim 3, wherein the point cloud comprises a point cloud for a first level of detail and the previously determined scalar value is for a second level of detail that is different than the first level of detail.

6. The device of claim 1, wherein to receive the syntax element, the one or more processors are further configured to receive the syntax element in an attribute slice header syntax structure.

7. The device of claim 1, wherein the one or more processors are further configured to determine the second predicted value for the point of the point cloud based on values for one or more different points of the point cloud.

8. The device of claim 1, wherein the point cloud comprises a point cloud for a first level of detail, and wherein to determine the scaling factor, the one or more processors are further configured to determine the scaling factor based on a scaling factor for a second level of detail that is different than the first level of detail.

9. The device of claim 1, wherein the first color component comprises a first chroma color component and the second color component comprises a second chroma color component.

10. The device of claim 9, wherein the one or more processors are further configured to for the point of the point cloud, determine a third attribute value for a third color component, wherein the third color component comprises a luma color component.

11. The device of claim 1, wherein the one or more processors are further configured to reconstruct the point cloud.

12. The device of claim 11, wherein the one or more processors are further configured to generate a map of an interior of a building based on the reconstructed point cloud.

13. The device of claim 11, wherein the one or more processors are further configured to perform an autonomous navigation operation based on the reconstructed point cloud.

14. The device of claim 11, wherein the one or more processors are further configured to generate computer graphics based on the reconstructed point cloud.

15. The device of claim 11, wherein the one or more processors are configured to:
determine a position of a virtual object based on the reconstructed point cloud; and
generate an extended reality (XR) visualization in which the virtual object is at the determined position.

16. The device of claim 11, further comprising a display to present imagery based on the reconstructed point cloud.

17. The device of claim 1, wherein the device is one of a mobile phone or tablet computer.

18. The device of claim 1, wherein the device is a vehicle.

19. The device of claim 1, wherein the device is an extended reality device.

20. A method of decoding encoded point cloud data to reconstruct a point cloud, the method comprising:
for a point of the point cloud, determining a first attribute value for a first color component based on a first predicted value and a first residual value;
receiving, in the encoded point cloud data, a syntax element indicating a scalar value, wherein the scalar value is an integer value;
applying a scaling factor to the first residual value to determine a predicted second residual value, wherein the scaling factor has a non-integer value, wherein applying the scaling factor to the first residual value comprises:
performing a multiplication by the scalar value; and
performing a right shift operation, wherein a result of a combination of the multiplication by the scalar value and the right shift operation is equal to the scaling factor;
for the point of the point cloud, receiving a second residual value in the encoded point cloud data;
determining a final second residual value based on the predicted second residual value and the received second residual value; and
for the point of the point cloud, determining a second attribute value for a second color component based on a second predicted value and the final second residual value.

21. The method of claim 20, wherein the right shift operation comprises a right shift by 2.

22. The method of claim 20, wherein the syntax element indicates a difference value corresponding to a difference between the scalar value and a previously determined scalar value.

23. The method of claim 22, wherein the syntax element comprises a variable length syntax element indicating the difference value.

24. The method of claim 22, wherein the point cloud comprises a point cloud for a first level of detail and the previously determined scalar value is for a second level of detail that is different than the first level of detail.

25. The method of claim 20, wherein receiving the syntax element comprises receiving the syntax element in an attribute slice header syntax structure.

26. The method of claim 20, further comprising determining the second predicted value for the point of the point cloud based on values for one or more different points of the point cloud.

27. The method of claim 20, wherein determining the scaling factor comprises determining the scaling factor based on a scaling factor for a second level of detail.

28. The method of claim 20, wherein the first color component comprises a first chroma color component and the second color component comprises a second chroma color component.

29. The method of claim 28, further comprising for the point of the point cloud, determining a third attribute value for a third color component, wherein the third color component comprises a luma color component.

30. A device for encoding point cloud data, the device comprising:
a memory configured to store the encoded point cloud data:
one or more processors, implemented in circuitry, and configured to:
for a point of a point cloud, determine a first attribute value for a first color component;
encode the first attribute value for the first color component as a first predicted value and a first residual value;
for the point of the point cloud, determine a second attribute value for a second color component;
determine a second predicted value for the second attribute value for the second color component;
determine a second residual value for the second attribute value for the second color component;
apply a scaling factor to the first residual value to determine a predicted second residual value, wherein the scaling factor has a non-integer value, wherein to apply the scaling factor to the first residual value, the one or more processors are further configured to:
perform a multiplication by a scalar value; and
perform a right shift operation, wherein a result of a combination of the multiplication by the scalar value and the right shift operation is equal to the scaling factor; and
generate, for inclusion in encoded point cloud data, a syntax element indicating the scalar value.

31. The device of claim 30, wherein to perform the bit shift operation, the one or more processors are further configured to perform a right shift by 2.

32. The device of claim 30, wherein the syntax element indicates a difference value corresponding to a difference between the scalar value and a previously determined scalar value.

33. The device of claim 32, wherein the syntax element comprises a variable length syntax element indicating the difference value.

34. The device of claim 32, wherein the point cloud comprises a point cloud for a first level of detail and the previously determined scalar value is for a second level of detail that is different than the first level of detail.

35. The device of claim 30, wherein to generate the syntax element, the one or more processors are further configured to include the syntax element for determining the scalar value in an attribute slice header syntax structure.

36. The device of claim 30, wherein the one or more processors are further configured to determine the second predicted value for the point of the point cloud based on values for one or more different points of the point cloud.

37. The device of claim 30, wherein the point cloud comprises a point cloud for a first level of detail, and wherein to determine the scaling factor, the one or more processors are further configured to determine the scaling factor based on a scaling factor for a second level of detail that is different than the first level of detail.

38. The device of claim 30, wherein the first color component comprises a first chroma color component and the second color component comprises a second chroma color component.

39. The device of claim 38, wherein the one or more processors are further configured to for the point of the point cloud, determine a third attribute value for a third color component, wherein the third color component comprises a luma color component.

40. The device of claim 30, further comprising a sensor to generate the encoded point cloud data.

41. A method of encoding point cloud data, the method comprising:
for a point of a point cloud, determining a first attribute value for a first color component;
encoding the first attribute value for the first color component as a first predicted value and a first residual value;
for the point of the point cloud, determining a second attribute value for a second color component;
determining a second predicted value for the second attribute value for the second color component;
determining a second residual value for the second attribute value for the second color component;
applying a scaling factor to the first residual value to determine a predicted second residual value, wherein the scaling factor has a non-integer value, wherein applying the scaling factor to the first residual value comprises:
performing a multiplication by a scalar value; and
performing a right shift operation, wherein a result of a combination of the multiplication by the scalar value and the right shift operation is equal to the scaling factor; and
generating, for inclusion in encoded point cloud data, a syntax indicating the scalar value.

42. The method of claim 41, wherein the right shift operation comprises a right shift by 2.

43. The method of claim 41, wherein the syntax element indicates a difference value corresponding to a difference between the scalar value and a previously determined scalar value.

44. The method of claim 43, wherein the syntax element comprises a variable length syntax element indicating the difference value.

45. The method of claim 43, wherein the point cloud comprises a point cloud for a first level of detail and the previously determined scalar value is for a second level of detail that is different than the first level of detail.

46. The method of claim 41, wherein generating the syntax element comprises including the syntax element for determining the scalar value in an attribute slice header syntax structure.

47. The method of claim 41, further comprising determining the second predicted value for the point of the point cloud based on values for one or more different points of the point cloud.

48. The method of claim 41, wherein determining the scaling factor comprises determining the scaling factor based on a scaling factor for a second level of detail.

49. The method of claim 41, wherein the first color component comprises a first chroma color component and the second color component comprises a second chroma color component.

50. The method of claim 49, further comprising for the point of the point cloud, determining a third attribute value for a third color component, wherein the third color component comprises a luma color component.

51. A computer-readable storage medium storing instructions that when executed by one or more processors cause the one or more processors to:
for a point of a point cloud of encoded point cloud data, determine a first attribute value for a first color component based on a first predicted value and a first residual value;
receive, in the encoded point cloud data, a syntax element indicating a scalar value, wherein the scalar value is an integer value;
apply a scaling factor to the first residual value to determine a predicted second residual value, wherein the scaling factor has a non-integer value, and wherein to apply the scaling factor to the first residual value, the instructions cause the one or more processors to:
perform a multiplication by the scalar value; and
perform a right shift operation, wherein a result of a combination of the multiplication by the scalar value and the right shift operation is equal to the scaling factor;
for the point of the point cloud, receive a second residual value in the encoded point cloud data;
determine a final second residual value based on the predicted second residual value and the received second residual value; and for the point of the point cloud, determine a second attribute value for a second color component based on a second predicted value and the final second residual value.

52. A computer-readable storage medium storing instructions that when executed by one or more processors cause the one or more processors to:
for a point of a point cloud, determine a first attribute value for a first color component;
encode the first attribute value for the first color component as a first predicted value and a first residual value;
for the point of the point cloud, determine a second attribute value for a second color component;
determine a second predicted value for the second attribute value for the second color component;
determine a second residual value for the second attribute value for the second color component;
apply a scaling factor to the first residual value to determine a predicted second residual value, wherein the scaling factor has a non-integer value, wherein to apply the scaling factor to the first residual value, the one or more processors are further configured to:
perform a multiplication by a scalar value; and
perform a right shift operation, wherein a result of a combination of the multiplication by the scalar value and the right shift operation is equal to the scaling factor; and
generate, for inclusion in encoded point cloud data, a syntax element indicating the scalar value.

* * * * *